United States Patent [19]

Jennings

[11] Patent Number: 5,517,584
[45] Date of Patent: May 14, 1996

[54] METHOD AND APPARATUS FOR HIGH-SPEED IMPLEMENTATION OF SCALING, DITHERING, AND DATA REMAPPING OPERATIONS WITH A SINGLE PROCESSOR

[75] Inventor: Kevin F. Jennings, Novi, Mich.

[73] Assignee: Unisys Corporation, Blue Bell, Pa.

[21] Appl. No.: 287,879

[22] Filed: Aug. 9, 1994

[51] Int. Cl.$^6$ .................................................. G06K 9/36
[52] U.S. Cl. ........................................... 382/276; 382/307
[58] Field of Search ................................. 382/41, 44, 47, 382/49, 276, 293, 298, 302, 307; 358/457; H04N 1/40

[56] References Cited

U.S. PATENT DOCUMENTS

| | | | |
|---|---|---|---|
| 4,665,556 | 5/1987 | Fukushima et al. | 382/41 |
| 4,751,660 | 6/1988 | Hedley | 364/518 |
| 4,817,175 | 3/1989 | Tenenbaum et al. | 382/41 |
| 4,982,342 | 1/1991 | Moribe et al. | 364/518 |
| 5,151,953 | 9/1992 | Landeta | 382/41 |
| 5,201,013 | 4/1993 | Kumagai | 382/50 |
| 5,201,030 | 4/1993 | Carrie | 395/132 |
| 5,204,916 | 4/1993 | Hamilton, Jr. et al. | 382/41 |
| 5,208,872 | 5/1993 | Fisher | 382/42 |
| 5,305,398 | 4/1994 | Klein et al. | 382/47 |
| 5,307,426 | 4/1994 | Kanno et al. | 382/50 |

FOREIGN PATENT DOCUMENTS

93/12507  6/1993  WIPO .................................. 382/41

OTHER PUBLICATIONS

Joan L. Mitchell, "Facsimile Image Coding", National Computer Conference, 1980, pp. 423–426.

Roy Hunter et al., "International Digital Facsimile Coding Standards", *Proceedings of the IEEE*, vol. 68, No. 7, Jul., 1980, pp. 854–867.

William C. Warner, "Compression Algorithms Reduce Digitized Images to Manageable Size", *EDN*, Jun. 21, 1990, pp. 203–212.

*Standardization of Group 3 Facsimile Apparatus for Document Transmission*, CCITT, Recommendations T.4–T.6 (Geneva, 1980, amended at Malaga–Torremolinos, 1984).

*Primary Examiner*—Leo Boudreau
*Assistant Examiner*—Andrew W. Johns
*Attorney, Agent, or Firm*—Nawrocki, Rooney & Sivertson

[57] ABSTRACT

An image processing hardware element that may be used to implement any number of data manipulation methods. The hardware element may be dedicated to the selected manipulation method such that maximum performance may be attained. The hardware element may be programmed to implement a particular manipulation method by simply down loading new values into the hardware element.

21 Claims, 11 Drawing Sheets

METHOD AND APPARATUS FOR HIGH-SPEED IMPLEMENTATION OF SCALING, DITHERING, AND DATA REMAPPING OPERATIONS WITH A SINGLE PROCESSOR

CROSS REFERENCE TO CO-PENDING APPLICATIONS

The present application is related to U.S. patent application Ser. No. 08/287,878, filed Aug. 9, 1994, entitled "Method and Apparatus for High Speed Efficient Bi-Directional Communication Between Multiple Processors Over a Common Bus", and U.S. patent application Ser. No. 08/288,061, filed Aug. 9, 1994, entitled "Method and Apparatus for Truncation of Images During Data Compression", both assigned to the assignee of the present invention and both incorporated herein by reference.

BACKGROUND OF THE INVENTION

1. Field of the Invention

The present invention generally relates to general purpose digital data processing systems and more particularly relates to such systems which perform scaling, dithering, and/or data remapping operations on a stream of image data.

2. Description of the Prior Art

Digital imaging has become increasingly popular over the past several years. Many types of documents that were in the past stored as paper documents may now be stored as digitized images. Examples of typical documents that are currently stored as digital images including engineering drawings, art work, and various other non-textual documents.

Scanners and video cameras may digitize documents thereby coding them as ones and zeros. In a typical system, a one represents a white portion of a document and a zero represent a black portion of a document. Digitizing devices may view a document as a large number of pixels wherein each pixel has a degree of darkness. The degree of darkness of a particular pixel may fall on a light to dark continuum. The digitizing device may assign the particular pixel a value of zero if the degree of darkness does not exceed a predetermined threshold of darkness. Similarly, the digitizing device may assign the particular pixel a value of one if the degree of darkness does exceed the predetermined threshold of darkness. The predetermined threshold of darkness can often be adjusted by the user of the digitizing device. In this way, a paper document may be represented as an array of pixels where each pixel may be represented by a one or a zero. A computer may be used to manipulate, store, or transmit the pixels as desired.

Often a document may have shades of gray contained therein rather than be made up of strictly black and white pixels. For these documents, a number of digital bits may be used to describe a particular shade of gray of a corresponding pixel within the digitized image. Depending on the number of shades of gray utilized, the quality of the duplicate image may be increased. For example, if an image utilizes four shades of gray to describe the original image, two bits of digital data may be used to describe each pixel within the image. Each combination of the two digitized bits describes one of the four shades of gray. Similarly, if an image utilizes 256 shades of gray, eight bits of digital data may be used to describe each pixel within the image. For high quality digitized images, it is common to use eight bits of digital data to describe each pixel within the image thereby allowing each pixel to be stored as one of 256 shades of gray.

The number of bits or pixels in an image depends on the size of the image and on the resolution of the digitizing device. Resolution is a measure of the precision of the digitizing device and is typically expressed in Dots Per Inch (DPI). The greater the DPI of a digitizing device, the more likely the digitized image will appear similar to the original document when a computer displays or prints the digitized image. Common resolutions used today include 100, 150, 200, 240, and 300 DPI.

A problem that is frequently encountered when various shades of gray are used when digitizing an image is that many output devices are limited to black and white pixels. Typical output devices include printers and CRT screens. This problem may be minimized by using a technique know as dithering. Dithering is the process of translating image data that contains data bits which indicate the grayness of a pixel into a digital image that is strictly represented by black and white pixels. There are several dithering algorithms that are widely used today.

One dithering algorithm that is popular allocates a number of printer "dots" to each pixel of the digitized image. It was recognized that it is possible to represent various shades of gray by having a number of dots of a printer correspond to each pixel in the image. By increasing the number of dots that are coded black within the corresponding pixel, the shade of gray appearing to the naked eye may be darkened. If the number of "dots" that are allocated to each pixel of the digitized image are increased, more shades of gray may be represented on the resulting printer or CRT screen. As long as the printed document is kept a reasonable distance from the eye, the image appears analog rather than digital.

Another dithering algorithm used today only requires one "dot" of a printer to be allocated to each pixel of the digitized image. In this algorithm, a predetermined number of pixels located in the same proximity to a selected pixel may be used to calculate whether the selected pixel should be black or white. Typically, the predetermined number of pixels located in the same proximity to the selected pixel are interpolated or averaged with the selected pixel to determine whether the selected pixel should be black or white. While this algorithm generally does not produce the same quality of image as the previously described dithering algorithm, much larger images may be printed because of the one-to-one correspondence between the image pixels and the printer "dots".

A dithering scheme which combines the above described dithering algorithm with a simple scanning algorithm is described in U.S. Pat. No. 5,307,426, issued on Apr. 26, 1994 to Kanno et al. Kanno employs a dithering scheme for images which contain a character region and a photographic region. For the character regions of an image, Kanno may store the quantized pixels as a one or a zero thereby allowing a high resolution of pixels in that region. For the photographic regions of an image, Kanno may store the quantized pixels as a number of data bits indicating the grayness of the corresponding pixel. This scheme exploits the fact that the maximum density difference of pixels in a character region of an image is typically large and the maximum density difference of pixels in a photographic region of an image is typically small. Kanno employs a quantization error technique to determine which regions within an image are character regions and which are photographic regions.

Because digitized images have become so popular in recent years, computer designers have developed many methods of manipulating the digitized image data for various purposes. The dithering methods described above are exemplary of some of these data manipulation methods.

Another example of a data manipulation method is know as scaling. Scaling refers to changing the size or other characteristic of an image in a predetermined way. For example, a digitized image may be "reduced" or "enlarged" by a predetermined factor. When scaling the size of a digitized image, the algorithm typically takes "M" data units as input and produces "N" data units as an output, where "M" is different than "N". A concrete example of this is when a life size image is captured at one resolution and displayed on a monitor having another resolution. In this situation, the digitized image must be scaled. Another example includes the scaling of the "grayness" of an image, either lighter or darker.

Yet another example of a data manipulation method is termed remapping. Remapping refers to performing an arbitrary function Y=F(X) on an input data stream to produce a different output data stream. One application for remapping may be to accent or highlight certain areas of an image.

Similar to the remapping manipulation method is the Nth order FIR filter manipulation method. The Nth order FIR filter manipulation method is a function which takes an input data element 'X1' as well as "N" of the previous data elements and computes the output according to the equation y=K1*X1+K2*X2+ . . . +KN*XN, where K1 . . . KN are arbitrary numbers used to weight the input values. K1 . . . KN are not necessarily constant values and therefore the relative weights may change with time. The Nth order FIR filter manipulation method may be used to "filter" predetermined characteristics from a digitized image. Digital signal processing techniques may also be employed to exploit this manipulation method.

In a typical prior art high speed systems, separate dedicated circuitry is provided for each of the manipulation methods described above. Therefore, if a prior art system is capable of performing a scaling, dithering, and remapping function, three different sets of hardware are typically incorporated into the system. A problem with the prior art systems is that typically only one of the manipulation algorithms is functioning at any given time. That is, the user of the computer system typically sets the system into a given data manipulation mode and all image data processed thereafter is processed in accordance with the preset manipulation mode. At a later time, the user may set the system into another manipulation mode wherein all image data processed thereafter is processed in accordance to the newly set manipulation mode. Since separate hardware is typically provided for each manipulation mode, the hardware not associated with the enabled manipulation mode is unused. This may consume unnecessary size and power within the computer system.

SUMMARY OF THE INVENTION

The present invention overcomes many of the disadvantages of the prior art by providing a single hardware element which may be used to implement any of the above described data manipulation methods. The hardware element may be dedicated to the selected manipulation method such that maximum performance may be attained. Unlike prior art systems, a manipulation method may be selected by simply down loading new values into the hardware element.

In one embodiment of the present invention, the hardware element comprises a data select block, a number of LUT elements, a packer, a post processor, and a control block. Each of the LUT elements may have a memory element contained therein. The data select block may route the image data to an address port within each of the LUT elements. The LUT elements may be loaded with values which implement the selected data manipulation method. The data that is provided by the LUT elements may be coupled to the packer wherein the packer may be programmed to select only certain bits from each data word that is provided by the LUT elements. The bit selection may be based on the selected manipulation method. The output of the packer may be coupled to the post processor block. The post processor block may receive the data provided by the packer until a full output data word is collected. When a full output data word is collected, the post processor block may output the data to a receiving user. Depending on the manipulation method selected, the post processor block may also add or otherwise perform arithmetic operations on the data provided by the packer.

The control block may be used to control the sequence and timing of the hardware element of the present invention. In a preferred mode of the present invention, the control block may comprise a memory element having an address port for providing a number of output control signals including an index field. The address port of the memory element may be coupled to the previous values of the output control signals along with a number of input control signals. Configured in this manner, a state machine is formed. The function of the state machine can be programmed by simply loading predetermined values into predetermined address locations within the memory element. The index field that may be provided by the memory element of the control block may be coupled to the address inputs of the LUT elements. In this way, the index field may be used to support the various manipulation methods as described herein.

In a remapping manipulation method, an input data stream may be directed by the data select block such that the least significant bits of the input data stream may be routed to an address input of a first LUT element and the most significant bits of the input data stream may be routed to an address input of a second LUT element. For the remapping manipulation method, the control block may impose a predetermined constant value on the index field.

As the input data stream enters the present embodiment, the least significant bits of the input data stream may be weighted in accordance with the data that is stored in the first LUT element. If each address location in the first LUT element contains a value that is equal to the value of the address location, the input data stream may pass unchanged through the first LUT element. However, the contents of the first LUT element may be programmed such that the input data stream may be modified in accordance with a predetermined function. For example, for any given input "X", the first LUT element may produce an output "Y" in accordance with a predetermined function F(X). Therefore, the first LUT element may be programmed to produce the function Y=F(X), where X is the input data stream and Y is the output data stream.

In a similar manner, as the input data stream enters the present embodiment, the most significant bits of the input data stream may be weighted in accordance with the data that is stored in the second LUT element. Therefore, the second LUT element may be programmed to produce the function Y=F(X), where X is the input data stream and Y is the output data stream.

The present embodiment is easily programmed with a predetermined function F(X). That is, the contents of the first LUT and the second LUT may be computed by calculating Y=F(X) for all possible values of X. The result may be stored in the corresponding LUT element.

In a second order FIR filter manipulation method, an input data stream may be directed by the data select block such that the least significant bits of the input data stream may be routed to the address input of the first LUT element and the previous values of the least significant bits of the input data stream may be routed to the address input of the second LUT element. When using the second order FIR filter manipulation method, the input data stream may be one-half of the width of the data stream discussed in the remapping manipulation method above. This may be desired because both the current data element and the previous data element are utilized in the second order FIR filter method. To keep the hardware to a minimum, only enough memory has been allocated to operate on two data elements in the preferred embodiment. However, it is contemplated that additional memory may be provided such that wider input data streams may be accommodated.

The contents of the first LUT element may be programmed such that the input data stream may be modified in accordance with a predetermined function. For example, for any given input "X1", the first LUT element may produce an output "K1*X1" in accordance with a predetermined function. Therefore, the first LUT element may be programmed to produce the function Y=K1*X1, where X1 is the input data stream and K1 is a constant value.

Similarly, as the input data stream enters the present embodiment, the previous value of the least significant bits of the input data stream may be weighted in accordance with the data that is stored in the second LUT element. For example, for any given input "X2", the second LUT element may produce an output "K2*X2" in accordance with a predetermined function. Therefore, the second LUT element may be programmed to produce the function Y=K2*X2, where X2 is the previous value of the input data stream and K2 is a constant value.

The results provided by the first LUT element and the second LUT element may be added together by the Post Processor Block to yield the result Y=K1*X1+K2*X2. It is contemplated that an Nth order FIR filter may be provided by adding additional LUT elements to the present embodiment.

For the second order FIR filter manipulation method described above, the control block may impose a predetermined constant value on the index field. Since the index field may be coupled to the address inputs of the first LUT and second LUT elements, the values of K1 and K2 may remain constant. However, it is contemplated that the control block may change the values imposed in the index field. This may result in having K1 and K2 vary in time thereby allowing complex Nth order FIR filtering with time varying constants.

In a scaling manipulation method, an input data stream may be directed by the data select block such that the least significant bits of the input data stream may be routed to the address input of the first LUT element and the most significant bits of the input data stream may be routed to the address input of the second LUT element. There are several methods that may be used to scale image data. One example of such a method is to drop every other input data element. The input data elements that are not dropped may be passed through the apparatus unchanged. In this simplified approach, every other input data element may be dropped, and a weighted average of a number of the previous input data elements may be computed and directed to the output of the apparatus. If every other input is dropped, the scaling factor may be 2:1. If every third input data element is dropped the scaling factor may be 3:2. This method can be applied for a wide variety of scaling factors as desired by a user.

In a preferred embodiment, a more accurate scaling method may be employed. In this embodiment, the current input data element and the previous input data element are weighted in accordance with the scale factor applied. For example, suppose a scale factor of 6:5 is desired. That is, six input data elements (Xi1, Xi2, Xi3, Xi4, Xi5, Xi6) must be converted into five output data elements (Xo1, Xo2, Xo3, Xo4, Xo5). The first output data element Xo1 may be computed by adding the first input data element Xi1 plus one-fifth times the second data element Xi2. That is, the first output data element may represent one and one-fifth of the input data elements. Similarly, the second output data element Xo2 may be computed as 4/5*Xi2+2/5*Xi3. The third output data element Xo3 may be computed as 3/5*Xi3+3/5*Xi4. The fourth output data element Xo4 may be computed as 2/5*Xi4+ 4/5*Xi5. Finally, the fifth output data element Xo5 may be computed as 1/5*Xi5+Xi6. This algorithm may be used to provide any scaling factor M:N where M and N are user definable. In implementing the exemplary scaling manipulation method, an input data stream may be directed by the data select block such that the least significant bits of the input data stream may be routed to the address input of the first LUT element and the previous values of the least significant bits of the input data stream may be routed to the address input of the second LUT element. When using the scaling manipulation method, the input data stream may be one-half of the width of the data stream discussed in the remapping manipulation method above. This may be desired because both the current data element and the previous data element are utilized in the exemplary scaling method. To keep the hardware to a minimum, only enough memory has been allocated to operate on two data elements in the preferred embodiment. However, it is contemplated that additional memory may be provided such that more input data elements may be accommodated.

An index field is provided to the address inputs of the first and second LUT elements. The index field may be incremented from zero to the number of expected output data elements minus one. For example, for a 6:5 scale factor, the index field may be incremented from 0-4 and then return back to zero. During the first cycle, a first input data element is read. However, an output data element cannot be provided because a second input data element is required to determined the appropriate value of the first output data element. Therefore, an output ready signal is not asserted during the first cycle thereby not allowing an output data element to propagate to the outputs of the apparatus. During the second through fifth cycles, the corresponding input data elements combines with the current index field to provide an address to each of the LUT elements. The LUT elements are programmed to weight the appropriate input data element in accordance with the current scale factor. For example, for the third output data element, using a scale factor of 6:5 as discussed above, the first LUT element may provide a 3/5 weight factor to Xi4. The second LUT element may provide a 3/5 weight factor to Xi3. An ALU may then add the results together to provide the third output data element to the outputs.

Another scaling manipulation method combines the two scaling manipulation methods described above. That is, every Nth input data element may be dropped while the remaining input data elements may be weighted in accordance with the method described in the previous paragraphs. This method may be useful when the particular scale factor would otherwise require more hardware than is provided by the present invention. For example, for a scale factor of 8:2, the exemplary scaling manipulation method described above would calculate Xo1=Xi1+Xi2+Xi3+Xi4. This would require that the last four input data elements be stored in memory. In the combined scaling manipulation method, the first, fourth, fifth and eighth input data element may be dropped and the remaining input data elements may be weighted in accordance with the previously describe scaling method. It is recognized that various numbers of input data elements may be dropped and still be within the scope of the present invention.

It is contemplated that additional hardware may be provided to store additional input data elements. However, to minimize the size and power required by the system, the preferred embodiment only has sufficient hardware to store the current input data element and the previous input data element.

Dithering is the process of translating image data that contains data bits which indicate the grayness of a pixel into a digital image that is strictly represented by white and black pixels. Therefore, a number of data bits may be contained in the input data stream and the output may contain a single block or white bit. Consistent therewith, one dithering algorithm only requires that one "dot" of a printer be allocated to each pixel in the digitized image. To accomplish this, an exemplary dithering algorithm utilizes a dithering matrix to determine whether a particular output pixel should be black or white. For example a 4×4 dithering matrix may be used wherein the 4×4 dithering matrix may correspond to a 4×4 block of pixels within the original image. Each of the pixels within the original image may then be compared to a corresponding element within the 4×4 dithering matrix. If the value of a pixel within the original image is greater than or equal to the value of the corresponding element within the 4×4 dithering matrix, the corresponding output pixel may be set to "black". Conversely, if the value of a pixel within the original image is less than the value of the corresponding element within the 4×4 dithering matrix, the corresponding output pixel may be set to "white". As the original image is processed, the 4×4 dithering matrix may be shifted over four positions to correspond to the next succeeding 4×4 block of pixels within the original image. This is continued until the entire original image is processed.

For the exemplary dithering manipulation method described above, the control block may impose various patterns on the index field. Since the index field may be coupled to the address inputs of the first LUT and second LUT elements, the values produced by the LUT elements may be programmed to provide a dithering matrix. That is, if four index bits are provided by the control block to the LUT elements, a 4×4 dithering matrix may be formed. Each of the pixels within a 4×4 block of corresponding pixels within the original image may then be "compared" to a corresponding one of the elements within the 4×4 dithering matrix. This compare is not an arithmetic compare, but rather the LUT elements may be programmed such that if the value of the original pixel does not exceed a predetermined address, the output of the corresponding LUT element may be zero.

In the exemplary dithering manipulation method, the input data elements have a greater number of bits than the resulting output data elements. In fact, the output data elements may contain only a single black or white bit. Since the LUT elements typically may provide more than one bit of data, it is contemplated that the packer may be used to select a predetermined number of bits that are provided by the LUT elements. In a preferred mode of the present invention, only the least significant bit of each of the data elements provided by the LUT devices are selected. The result is provided to the post processor. The post processor may collect the bits as they are provided by the packer until a full output data word is achieved. Once a full output data word is achieved, the post processor may release the data to a receiving user.

The present invention may be used to efficiently perform dithering on an input image in real time. The above description is only an exemplary dithering algorithm. It is contemplated that other dithering algorithms may be employed and still be within the scope of the present invention.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
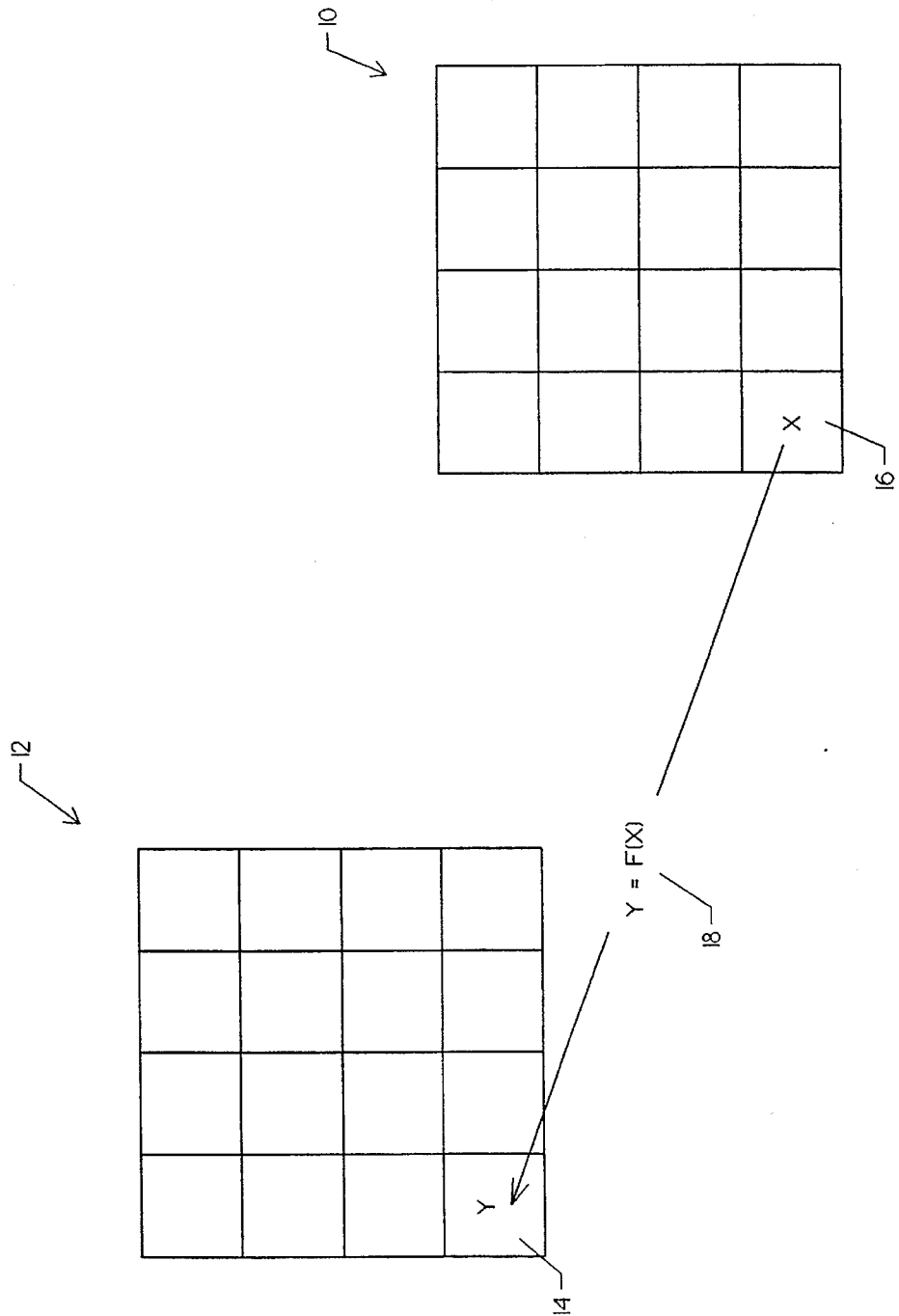
FIG. 1 is a diagram illustrating a remapping manipulation method.

FIG. 1 is a diagram illustrating a remapping manipulation method. Scanner and video cameras may digitize documents thereby coding them as ones and zeros. The resulting digitized image may be manipulated with various manipulation methods. One such method is a remapping manipulation method. Remapping refers to preforming an arbitrary function on an input data stream to produce a different output data stream.

Referring to FIG. 1, a digitized image is generally shown at 10 which comprises a plurality of pixels. Each pixel is represented by a data element. Each of the data elements may be manipulated using a manipulation method to produce a resulting digitized image generally shown at 12. For example, a pixel 16 may comprise a data element "X". A remapping function 18, may preform an arbitrary function on the data element "X" that represents pixel 16, and provide the result to a pixel 14 in the resulting digitized image 12. Each of the pixels in digitized image 10 may be operated on by remapping function 18 resulting in a corresponding pixel in resulting digitized image 12. One application for the remapping manipulation method may be to accent or highlight certain areas of an image.

Figure 2:
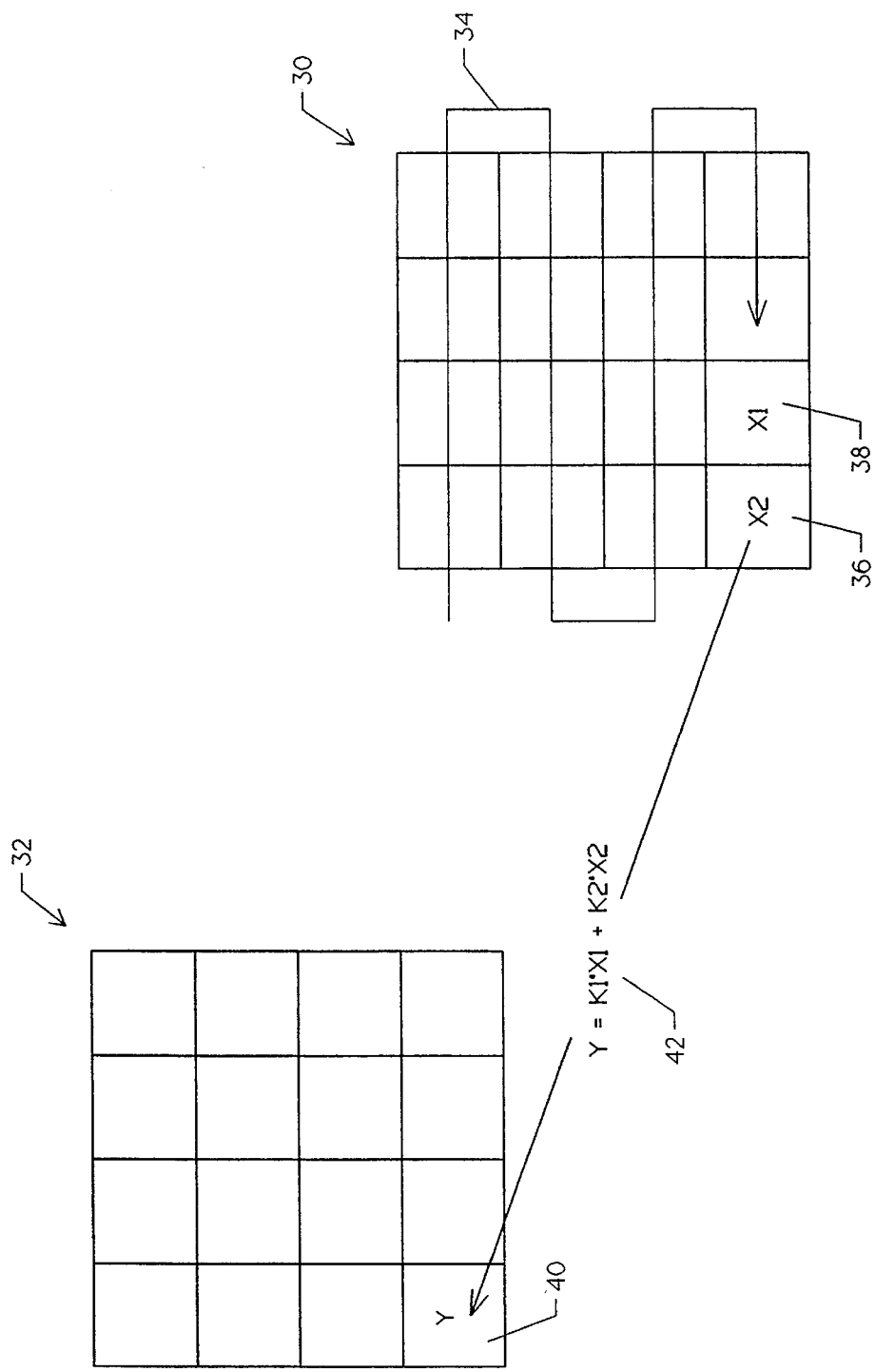
FIG. 2 is a diagram illustrating a second order FIR filter manipulation method.

FIG. 2 is a diagram illustrating a second order FIR filter manipulation method. Similar to the remapping manipulation method described above, the NTH order FIR filter manipulation method performs an arbitrary function on an input data stream. The NTH order FIR filter manipulation method is a function which takes an input data element "X1" as well as "N" of the previous input data elements and computes an output according to the equation $Y=K1*X1+K2*X2+\ldots+KN*XN$, where $K1\ldots KN$ are arbitrary numbers used to weight the corresponding input values. $K1\ldots KN$ are not necessarily constant values and therefore the relative weights may change with time. The NTH order FIR filter manipulation method may be used to "filter" predetermined characteristics from a digitized image. Digital signal processing techniques may also be used to exploit this manipulation method.

Referring to FIG. 2, a digitized image is generally shown at 30. Digitized image 30 may be generated via a scanner or video camera. Typically, an image may be scanned one line at a time from top to bottom as shown at 34. In this configuration, a pixel 36 may be the last pixel scanned and a pixel 38 may be the second to last pixel scanned from digitized image 30. A second order FIR filter manipulation method may operate on the data elements contained in pixels 36 and 38 and provides the result to pixel 40 of a resulting digitized image 32. The second order FIR filter function is generally shown at 42 where K1 and K2 are arbitrary numbers used to weight the input data elements X1 and X2, respectively. As previously stated, K1 and K2 may not necessarily be constant values and therefore the relative weights attached to X1 and X2 may change with time.

Figure 3:
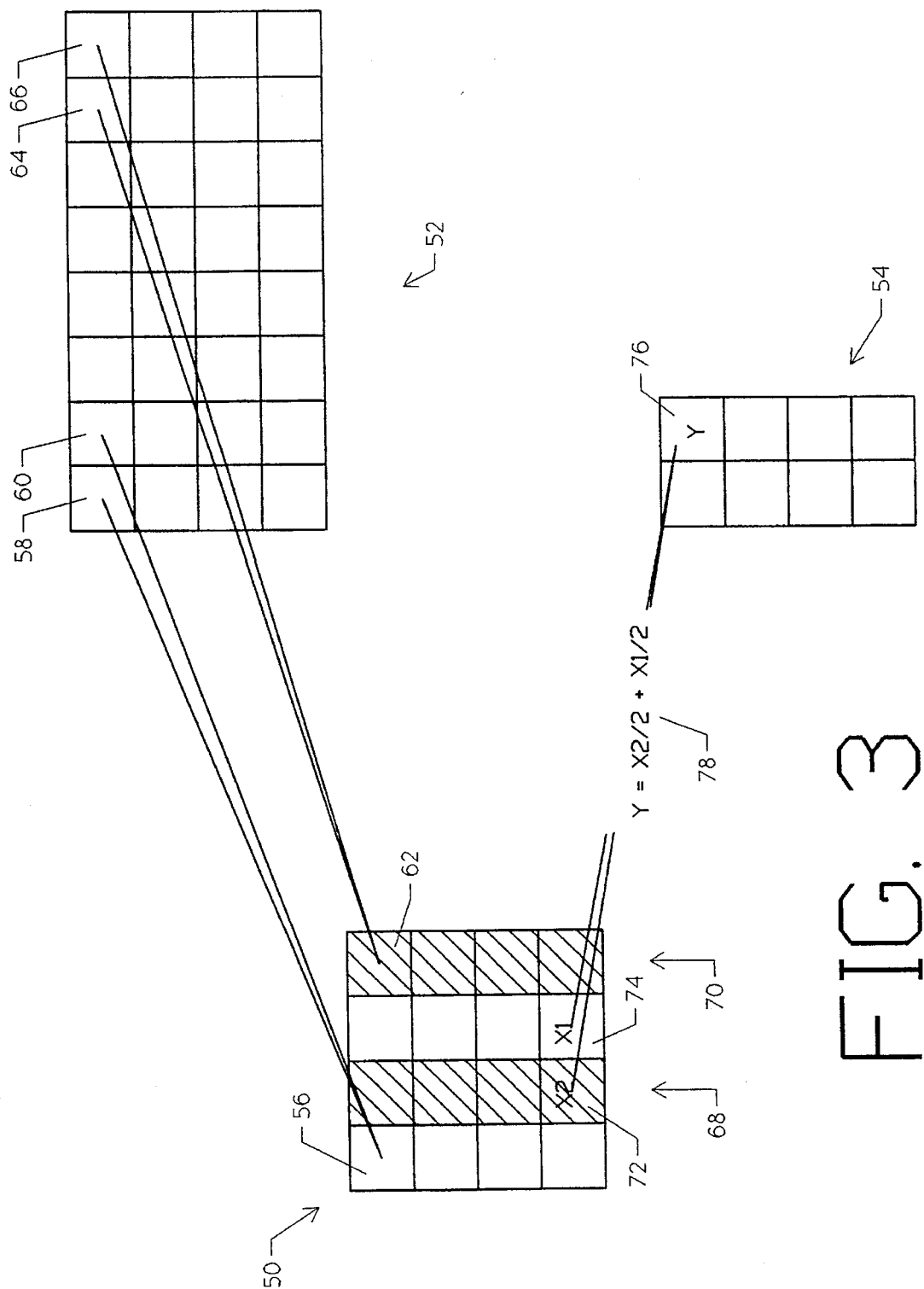
FIG. 3 is a diagram illustrating a scaling manipulation method.

FIG. 3 is a diagram illustrating a scaling manipulation method. The scaling manipulation method refers to changing the size or other characteristic of an image in a predetermined way. For example, a digitized image may be "reduced" or "enlarged" by a predetermined factor. When scaling the size of digitized image, the algorithm typically takes "M" data units as input and produces "N" data units as an output where "M" in different than "N". A concrete example of this is when a life-size image is captured at one resolution and displayed on a monitor with another resolution. In this situation, the digitized image must be scaled. There are several methods which may be employed to scale a digitized image. For example, to "reduce" a digitized image to one-half of it's original size, a scaling algorithm could: (1) drop every other input and then passing the remaining data unchanged to the output; or (2) drop every other input but instead of passing the remaining data unchanged, compute a weighted average of a predetermined number of the previous input elements and provide the result to the output.

Referring to FIG. 3, a digitized image is generally shown at 50. An digitized image that is enlarged in the X dimension by a factor of 2 is generally shown at 52. A digitized image that is reduced in the X dimension by a factor 2 is generally shown at 54. One method for enlarging an image by a factor of 2 is simply to duplicate a particulate image pixel from the original digitized image and place the result in the resulting digitized image. That is, a pixel 56 of digitized image 50 may be duplicated and placed adjacent together at a pixel 58 and a pixel 60 of resulting digitized image 52. Similarly, a pixel 62 of digitized image 50 may be duplicated and placed together at a pixel 64 and a pixel 66 of resulting digitized image 52. This produces a resulting digitized image 52 which is enlarged in the X dimension by a factor of 2. A similar process may be used to enlarge the digitized image in the Y dimension as well.

As previously stated, one method for reducing a digitized image by a factor of 2 is to drop every other input data element from the input digitized image and to compute a weighted average of a predetermined number of the previous input data elements. That is, a column 68 and a column 70 may be dropped from digitized image 50. However, the data elements representing a pixel 72 and a pixel 74 may be average together as shown at 78 and provided to pixel 76 of reduced digitized image 54. A similar method may be used to reduce the digitized image in the Y dimension as well. It is recognized that the described methods for scaling an image are only exemplary. Other algorithms may be used to reduce or enlarge digitized image 50.

Figure 4:
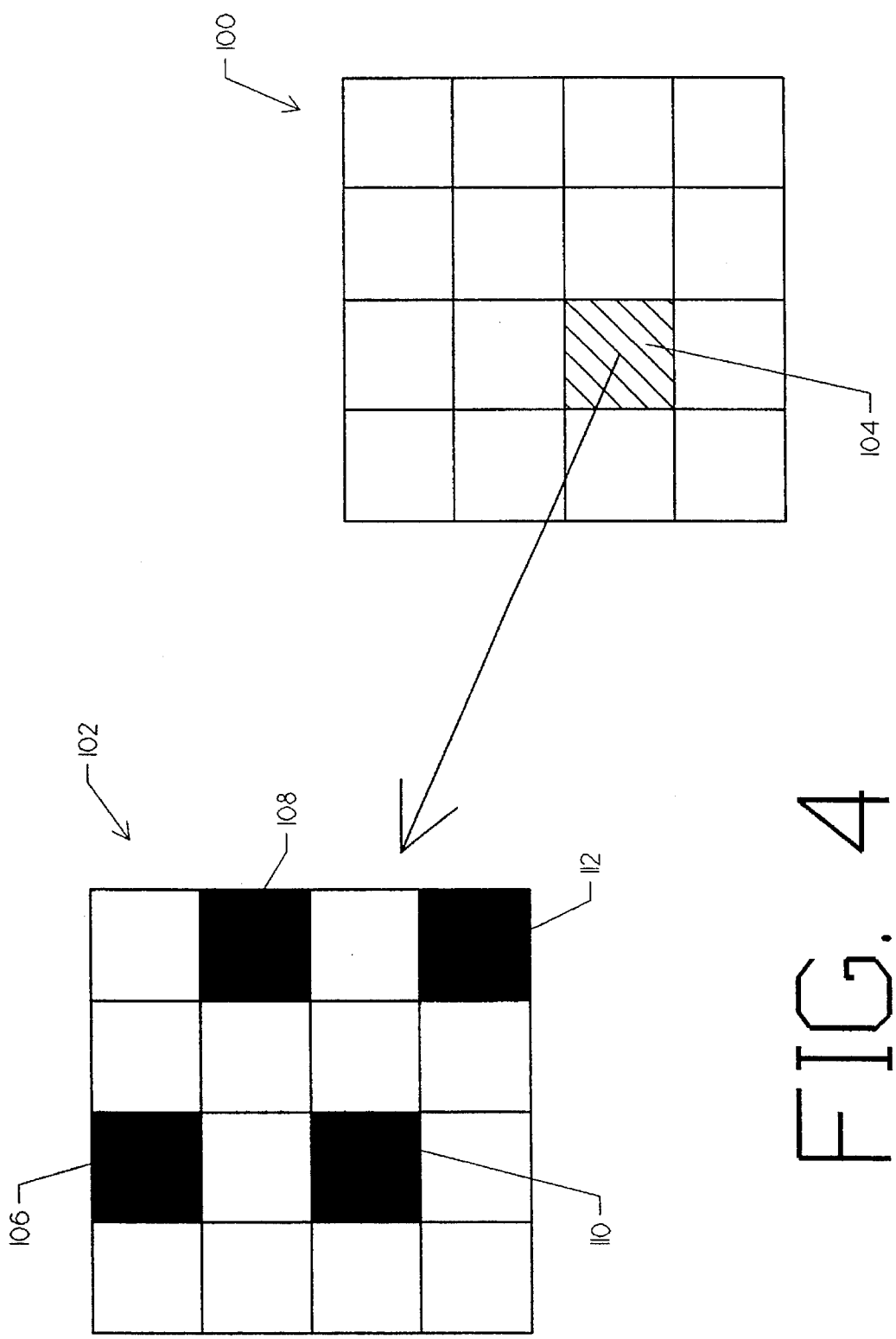
FIG. 4 is a diagram illustrating a first dithering manipulation method.

FIG. 4 is a diagram illustrating a first dithering manipulating method. Often, a document may have shades of gray contained therein rather than be made up of exclusively black and white pixels. For these documents, a number of digital bits may be used to describe a particular shade of gray of a corresponding pixel within the digitized image. Depending on the number of digital bits used to represent each pixel, the quality of the duplicate image may be increased. For example, if an image utilizes four shades of gray to describe the original image, two bits of digital data may be used to describe each pixel within the image. Each combination of the two digitized bits may describe one of four shades of gray. Similarly, if an image utilizes 256 shades of gray, eight bits of digital data may be used to describe each pixel within the image. For high quality digital images, it is common to use eight bits of digital data to describe each pixel within the image.

A problem that is frequently encountered when various shades of gray are used when digitizing an image is that many output devices are limited to displaying only black and white pixels. Typical output devices include printers and CRT screens. This problem may be minimized by using a technique known as dithering. Dithering is the process of translating image data that contains data bits which indicate the grayness of a pixel into a digital image that is strictly represented by white and black pixels. There are several dithering algorithms that are widely used today.

One dithering algorithm that is popular allocates a number of printed "dots" to each pixel of the digitized image. It was recognized that it is possible to represents various shades of gray by having a number of dots of a printer corresponding to each pixel in the image. By increasing the number of "dots" that are coded black within the corresponding pixel of the image, the shade of gray appearing to the naked eye may be darkened. If the number of "dots" that are allocated to each pixel of the digitized image are increased, more shades of gray may be represented on the resulting printer or CRT screen. As stated above, as long as the printed document is kept a reasonable distance from the eye, the image appears analog rather than digital.

Referring to FIG. 4, a digitized image is shown generally at 100. Each pixel within digitized image 100 may be represented by a predetermined number of bits thereby indicating the shade of gray of each pixel contained therein. Therefore, a pixel 104 is represented by a predetermined number of bits indicating the grayness of pixel 104. The first dithering algorithm allocates a number of printer "dots" to each pixel of the digitized image. In the case of FIG. 4, pixel 104 of digitized image 100 may be represented by 16 printer "dots" as shown generally at 102. By increasing the number of dots that are coded black at 102, the shade of gray appearing to the naked eye may be darkened. As shown at 102, pixels 106, 108, 110, and 112 have been coded black to indicate an exemplary shade of gray in corresponding pixel 104.

A problem with the first dithering algorithm is that the resolution of the output device must be greater than the resolution of the original digitized image. That is, for each pixel within the original digitized image as shown at 104, a predetermined number of "dots" of the output device must be allocated thereto. A practical result of this limitation is that either only a portion of the original digitized image 100 may be output to an output device or the resolution of the original digitized image may not be optimized.

Figure 5:
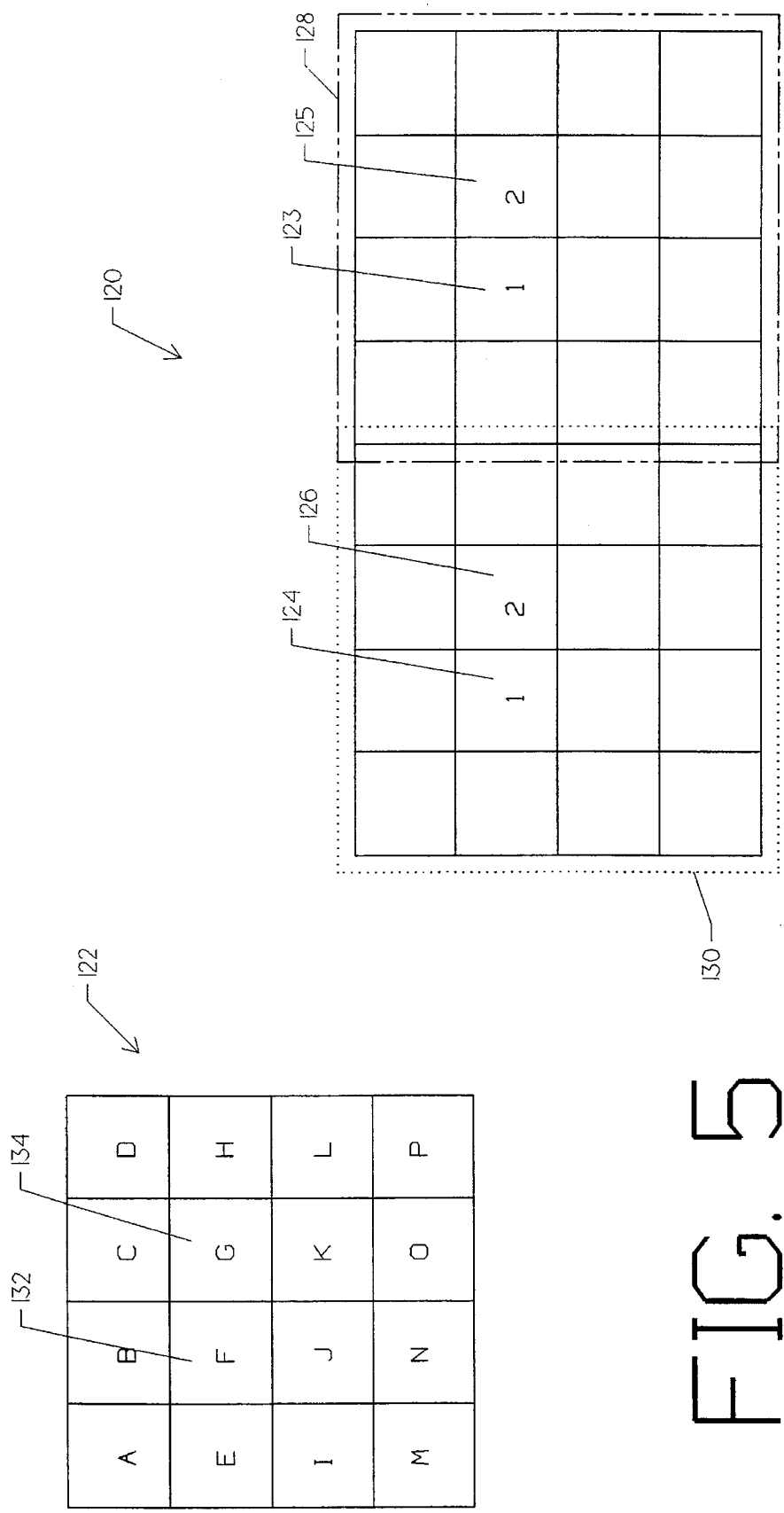
FIG. 5 is a diagram illustrating a second dithering manipulation method.

FIG. 5 is a diagram illustrating a second dithering manipulation method. The second dithering algorithm may only require one "dot" of a printer to be allocated to each pixel in the digitized image. While this algorithm generally does not produce the same quality of images as the previously described dithering algorithm, much larger images may be produced because of the one-to-one correspondence between the image pixels and the printer "dots".

An exemplary dithering algorithm utilizes a dithering matrix to determine whether a particular output pixel should be black or white. For example a 4×4 dithering matrix shown generally at 122 may be used wherein the 4×4 dithering matrix 122 may correspond to a 4×4 block of pixels within the original image shown at 130. Each of the pixels within the original image may then be compared to a corresponding element within the 4×4 dithering matrix 122. If the value of a pixel 124 within the original image is greater than or equal to the value of the corresponding element 132 within the 4×4 dithering matrix 122, the corresponding output pixel may be set to "black". Conversely, if the value of a pixel 134 within the original image is less than the value of the corresponding element 126 within the 4×4 dithering matrix 122, the corresponding output pixel may be set to "white". As the original image is processed, the 4×4 dithering matrix may be shifted over four positions to correspond to the next succeeding 4×4 block of pixels within the original image as shown at 128. This is continued until the entire original image is processed.

Figure 6:
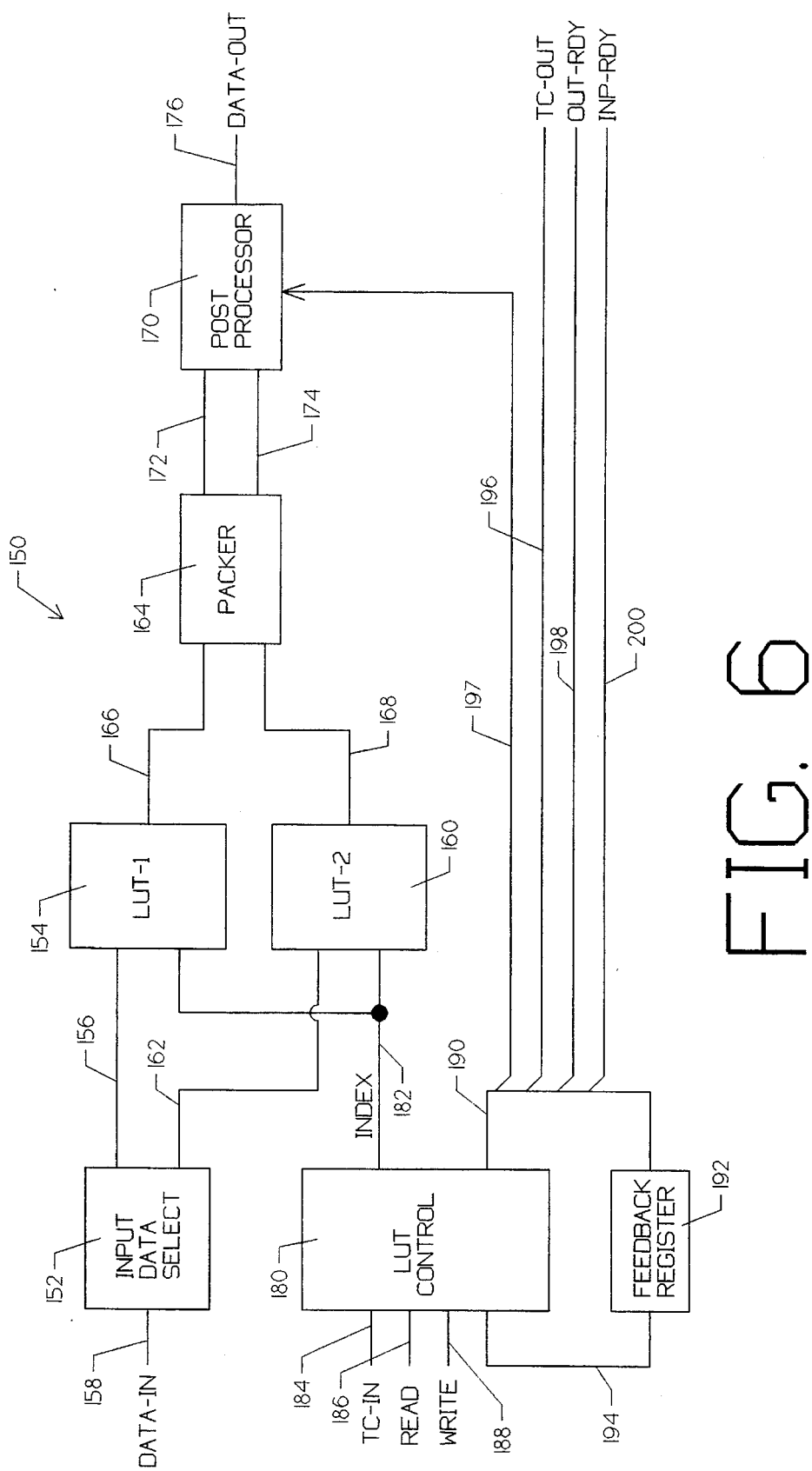
FIG. 6 is a block diagram of an exemplary embodiment of the present invention.

FIG. 6 is a block diagram of an exemplary embodiment of the present invention. In a typical system, separate independent circuitry is provided for each of the aforementioned manipulation methods. A problem with the prior art systems, is that typically only one of the manipulation algorithms is functioning at any given time. That is, the user of the computer system typically sets the system into a given manipulation mode and all image data processed thereafter is processed in accordance with the preset manipulation mode. At a later time, a user may set the system into another manipulation mode wherein all image data processed thereafter is processed in accordance with the newly set manipulation mode. Since separate independent hardware is provided for each manipulation mode, the hardware not associated with the enabled manipulation mode is idle. This may consume unnecessary size and power within the computer system.

The present invention overcomes many of the disadvantages of the prior art by providing a hardware element which may be used to implement any of the above-described data manipulation methods. In addition, it is contemplated that the present invention may implement other data manipulation methods. The hardware of the present invention may be dedicated to the selected manipulation method such that the maximum performance may be achieved. Unlike prior art systems, a manipulation method may be selected by simply downloading new values into the present hardware. In addition, the present invention does not have separate independent hardware dedicated to each manipulation method thereby minimizing the size and power requirements of a corresponding computer system.

Referring to FIG. 6, an exemplary embodiment of the present invention comprises a data select block 152, a first LUT element 154, a second LUT element 160, a packer 164, a post processor 170, and a LUT control element 180. Input data select block 152 receives a data in stream via interface 158. The input data stream may be a serial data stream of the data element of an image. Input data select block 152 is coupled to a first LUT element 154 via interface 156. Input data select block 152 is coupled to a second LUT element 160 via interface 162. Depending on the manipulation method, input data select block 152 may route the least significant bits of a data element provided by interface 158 onto interface 156 and the most significant bits of a data element provided by interface 158 onto interface 162. This is the case for the remapping method, various scaling methods, and various dithering methods.

When certain manipulation methods are utilized, input data select block 152 may only accept the least significant bits from interface 158. This may be desired when the data manipulation method requires a previous data element provided by interface 158 as well as the current data element. For example, the second order FIR filtering manipulation method, various scaling manipulation methods, and various dithering manipulation methods may operate on previous data elements. If a manipulation method requires a previous data element, input data select block 152 provides the previous data element on interface 162.

The first LUT element 154 is coupled to a packer 164 via interface 166. The second LUT element is coupled to packer 164 via interface 168. Packer 164 may be programmed to select only certain bits from each data word that is provided by the first LUT element 154 and the second LUT element 160 wherein the bits selected depends on the selected manipulation method. Packer 164 is coupled to a post processor 170 via interfaces 172 and 174. Post processor 170 may receive the data provided by packer 164 until a full output data word is collected. When a full output data word is collected, post processor 170 may output the data to a receiving user via interface 176. Post processor 170 may be controlled by control bits provided by LUT control 180 via interface 197. Included in these control bits may be an out-rdy signal (see infra) which indicates when post processor 170 may provide data to a receiving user. Depending on the manipulation method selected, post processor 170 may also add or otherwise perform arithmetic operations on the data provided by packer 164.

LUT control 180 may be used to control the sequence and timing of the present invention. In an exemplary embodiment of the present invention, LUT control 180 may comprise a state machine that may be programmed by loading predetermined valued therein. LUT control 180 may provide an index field to the first LUT element 154 and the second LUT element 160 via interface 182. LUT control 180 may have a TC-IN input port 184, a read input port 186, and a write input port 188. LUT control 180 may provide a TC-OUT signal 196, a OUT-RDY signal 198 and a INP-RDY 200 signal. These output signals along with the index field 182 may be coupled to a feedback register 192 via interface 190. Feedback register 192 may provide the previous values of the output control signals to the input of LUT control 180 via interface 194. This configuration allows LUT control 180 to operate as a state machine whereby the function of the state machine can be changed by simply down loading new values into the LUT control device.

Figure 7:
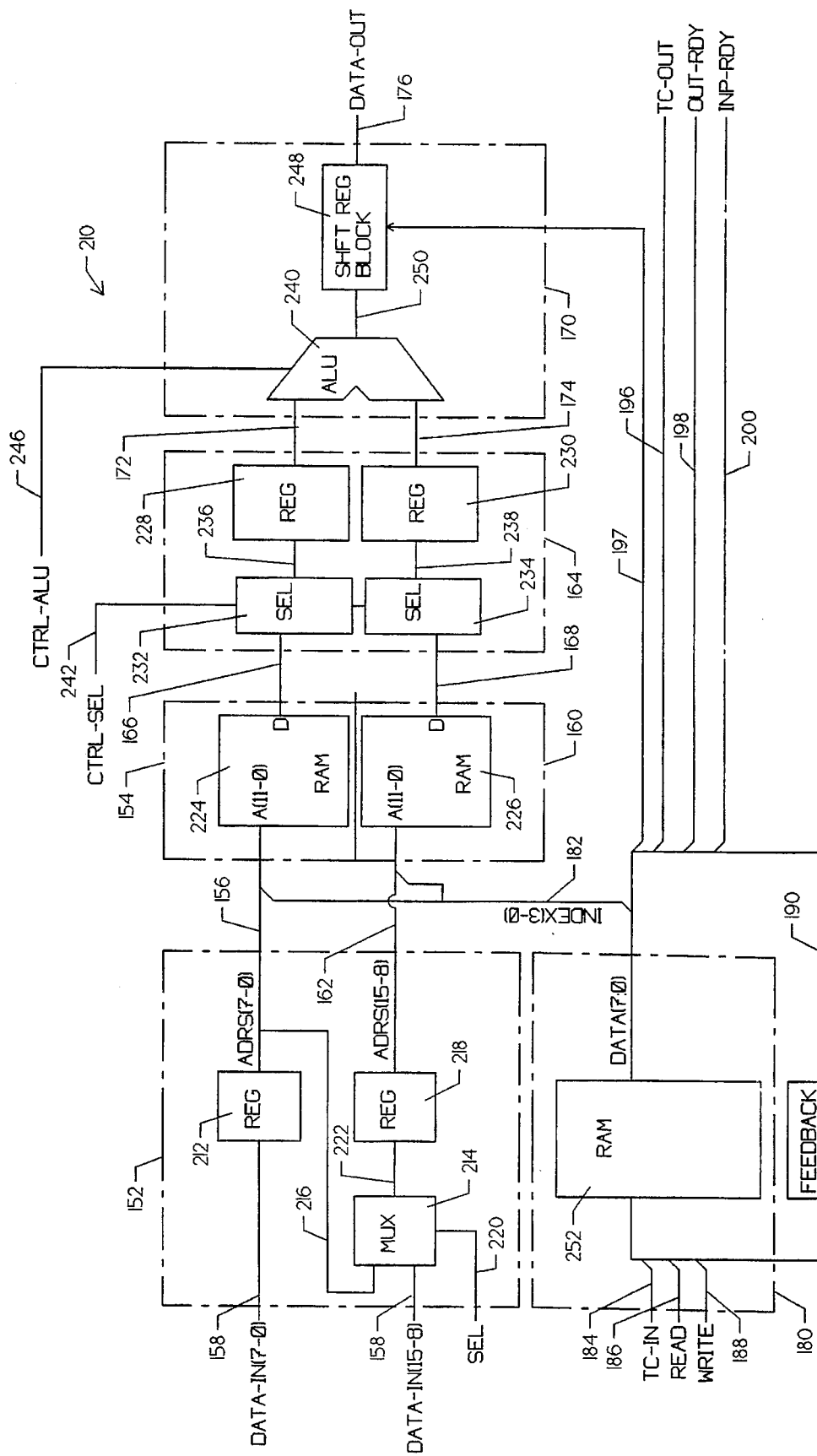
FIG. 7 is a schematic diagram of the exemplary embodiment as shown in FIG. 6.

FIG. 7 is a schematic diagram of the exemplary embodiment shown in FIG. 6. The schematic diagram is generally shown at 210. The apparatus generally comprises an input data select block 152, a first LUT element 154, a second LUT element 160, a packer 164, a post processor 170, and a LUT control block 180. The input data select block 152 may comprise a register 212 for receiving the least significant bits provided on interface 158. Register 212 may be coupled to MUX 214 via interface 216. MUX 214 may receive the most significant bits provided by interface 158. MUX 214 may be controlled by a select input on interface 220. The output of MUX 214 may be coupled to a register 218 via interface 222. When utilizing manipulation methods that do not require the previous data element, the select input of MUX 214 may be set to select the most significant bits provided on interface 158. The result is passed to register 218 via interface 222. In this case, register 212 captures and provides the least significant bits of the data provided on interface 158 to interface 156. Similarly, register 218 captures and provides the most significant bits provided on interface 158 to interface 162. When employing a manipulation method that requires the previous input data, the select input of MUX 214 is set to select the output of register 212. In this case, the least significant bits provided on interface 158 are provided into interface 156 via register 212. However, register 218 captures and provides the previous input data via interface 216 to interface 162.

The first LUT element 154 may comprise RAM 224. The address input of RAM 224 may be coupled to interface 156. Similarly, the second LUT element 160 may comprise a RAM 226. The address input of RAM 226 may be coupled to interface 162. Packer 164 may comprise a bit select circuit 232 and a shift register 228. Bit select circuit 232 is coupled to RAM 224 via interface 166. Bit select block 232 is further coupled to shift register 228 via interface 236. Similarly, a bit select block 234 may be coupled to RAM 226 via interface 168. Bit select block 234 may be further coupled to shift register 230 via interface 238. Bit select blocks 232 and 234 may be controlled by a CTRL-SEL signal on interface 242. Bit select blocks 232 and 234 may select all of the bits provided by RAMs 224 and 226 or predetermined subset thereof. For example, bit select blocks 232 and 234 may select only the least significant four bits that are provided by RAMs 224 and 226, respectively. Similarly, bit select blocks 232 and 234 may select only the least significant bit provided by RAMs 224 and 226, respectively.

Shift registers 228 and 230 accept data from bit select blocks 232 and 234, respectively. At the same time shift registers 228 and 230 are storing the data provided by bit select blocks 232 and 234, shift registers 228 and 230 may shifts the current contents of shift registers 228 and 230 to make room for the newly provided data.

Post processor 170 may comprise an arithmetic logic unit (ALU) 240 and a shift register block 248. ALU 240 may be coupled to shift register 228 via interface 172. ALU 240 may further be coupled to shift register 230 via interface 174. ALU block 240 may be coupled to shift register block 248 via interface 250. The functions provided by ALU block 240 may be controlled by a CTRL-ALU signal on interface 246. ALU block 240 may pass the output of shift register 228 directly to shift register block 248. ALU block 240 may also pass the output of shift register 230 directly to shift register block 248. ALU block 240 may also add the values provided by shift registers 228 and 230 and provide the result to shift register block 248. In any case, shift register block 248 may receive the data provided by ALU 240 until a full data word is collected. When a full data word is collected, shift register block 248 may output the data on interface 176 to a receiving user. Shift register block 248 may be controlled by control bits provided by LUT control 180 via interface 197. Included in these control bits may be an out-rdy signal which indicates when shift register block 248 may provide data to a receiving user.

LUT control 180 may be used to control the sequence and timing of the present invention. In an exemplary mode of the present invention, LUT control 180 may comprise a RAM 252. An address input of RAM 252 may be coupled to the previous values of the output control signals along with a number of input control signal. When RAM 252 is configured in this manner, a state machine is formed. The function of the state machine can be programmed by simply loading predetermined values into RAM 252. A portion of the data provided by RAM 252 may be provided to the address inputs of RAM 224 and RAM 226 via interface 182.

In a remapping manipulation method, an input data stream may be directed by the data select block 152 such that the least significant bits of the data stream may be routed to the address input of RAM 224 and the most significant bits of the input data stream may be routed to the address input of RAM 226. For the remapping manipulation, the control RAM 252 may impose a predetermined constant value on the index field via interface 182. However, it is contemplated that control RAM 252 may impose a variable value on the index filed via interface 182.

As the input data stream enters the exemplary embodiment on interface 158, the most significant bits of the input data stream may be weighted in accordance with the data that is stored in RAM 224. If each address location in RAM 224 contains a value that is equal to the value of the corresponding address location, the input data stream may pass unchanged through RAM 224. However, the contents of RAM 224 may be programmed such that the input data stream may be modified in accordance with a predetermined function. For example, for any given input "X" RAM 224 may produce an output "Y" in accordance with a predetermined F(X). Therefore, RAM 224 may be programmed to produce the function Y=F(X), where X is the input data stream and Y is the output data stream.

In a similar manner, as the input data stream enters the exemplary embodiment on interface 158, the most significant bits of the input data stream may be weighted in accordance with the data that is stored in RAM 226. Therefore, RAM 226 may be programmed to produce the function Y=F(X), where X is the input data stream and Y is the output data stream.

The exemplary embodiment shown in FIG. 7 is easily programmed with a predetermined function F(X). The contents of RAM 224 and RAM 226 may be computed by calculating Y=F(X) for all possible values of X. The result is stored in the corresponding address location within RAM 224 and RAM 226.

In a second order FIR filter manipulation method, an input data stream on interface 158 may be directed by the data select block 152 such that the least significant bits of the input data stream may be routed to the address input of RAM 224. Further, data select block 152 may route the previous values of the least significant bits of the input data stream to the address input of RAM 226. When using the second order FIR filter manipulation method, the input data stream may be one-half the width of the data stream discussed in the remapping manipulation method above. This may be desired because both the current data element and the previous data element are utilized in the second order FIR filter method. To keep the hardware to a minimum, only enough memory has been allocated in the exemplary embodiment to operate on two data elements. However, it is contemplated that additional memory may be provided such that wider input data streams may be accommodated. That is, more registers may be provided in data select 152 and more memory may be provided in the first and second LUT elements. In this way, NTH order FIR filter manipulation methods may be realized.

The contents of RAM 224 may be programmed such that the input data stream may be modified in accordance with a predetermined function. For example, for any given input "X1", RAM 224 may produce an output "K1*X1" in accordance with a predetermined function. Therefore, the RAM 224 may be programmed to produce the function Y=K1*X1, where X1 is the input data stream and K1 is a constant value.

Similarly, as the input data stream enters the exemplary embodiment on interface 158, the previous value of the least significant bits of the input data stream may be weighted in accordance with the data that is stored in RAM 226. For example, for any given input "X2", RAM 226 may produce an output "K2*X2" in accordance with a predetermined function. Therefore, RAM 226 may be programmed to produce the function Y=K2*X2, where X2 is the previous value of the input data stream and K2 is a constant value.

The result provided by RAM 224 and RAM 226 may be added together by ALU 240 to yield the result Y=K1*X1+K2*X2. As previously stated, it is contemplated that an NTH order FIR filter may be provided by adding additional LUT elements to the exemplary embodiment.

For the second order FIR filter manipulation method described above, LUT control 180 may impose a predetermined constant value on the index field via interface 182. Since the index field may be coupled to the address input of RAM 224 and RAM 226, the values of K1 and K2 may remain constant. However, it is contemplated that LUT control 180 may change the values imposed on the index field. This may result in having K1 and K2 varying in time thereby allowing complex Nth order FIR filtering with time varying constants.

In a scaling manipulation method, an input data stream may be directed by data select block 152 such that the least significant bits of the input data stream may be routed to the address input of RAM 224 and the most significant bits of the input data stream may be routed to the address input of RAM 226.

There are several methods that may be used to scale image data. One example of such a method is to drop every other input data element. The input data elements that are not dropped may be passed through the apparatus unchanged. In this simplified approach, every other input data element may be dropped, and a weighted average of a number of the previous input data elements may be computed and directed to the output of the apparatus. If every other input is dropped, the scaling factor may be 2:1. If every third input data element is dropped the scaling factor may be 3:2. This method can be applied for a wide variety of scaling factors as desired by a user.

In a preferred embodiment, a more accurate scaling method may be employed. In this embodiment, the current input data element and the previous data element are weighted in accordance with the scale factor applied. For example, suppose a scale factor of 6:5 is desired. That is, six input data elements (Xi1, Xi2, Xi3, Xi4, Xi5, Xi6) may be converted into five output data elements (Xo1, Xo2, Xo3, Xo4, Xo5). The first output data element Xo1 may be computed by adding the first input data element Xi1 plus one-fifth times the second input data element Xi2. That is, the first output data element may represent one and one-fifth of the input data elements. Similarly, the second output data element Xo2 may be computed as 4/5*Xi2+2/5*Xi3. The third output data element Xo3 may be computed as 3/5*Xi3+ 3/5*Xi4. The fourth output data element Xo4 may be computed as 2/5*Xi4+4/5*Xi5. Finally, the fifth output data element Xo5 may be computed as 1/5*Xi5+Xi6. This algorithm may be used to provide any scaling factor M:N where M and N are user definable.

In implementing the exemplary scaling manipulation method, an input data stream may be directed by data select block 152 such that the least significant bits of the input data stream may be routed to the address input of RAM 224 and the previous values of the least significant bits of the input data stream may be routed to the address input of RAM 226. When using this scaling manipulation method, the input data stream may be one-half of the width of the data stream discussed in the remapping manipulation method above. This may be desired because both the current data element and the previous data element are utilized in the exemplary scaling method. To keep the hardware to a minimum, only enough memory has been allocated to operate on two data elements in the preferred embodiment. However, it is contemplated that additional memory may be provided such that more input data elements may be accommodated.

An index field 182 is provided to the address inputs of RAMs 224 and 226. Index field 182 may be incremented from zero to the number of expected output data elements minus one. For example, for a 6:5 scale factor, the index field may be incremented from 0–4 and then return back to zero. During the first cycle, a first input data element is read. However, an output data element cannot be immediately provided because a second input data element is required to determined the appropriate value of the first output data element. Therefore, an out-rdy signal 197 may not be asserted during the first cycle thereby not allowing an output data element to propagate to the outputs of the apparatus. During the second through fifth cycles, the corresponding input data elements combines with the current index field 182 to provide an address to RAMs 224 and 226. RAMs 224 and 226 are programmed to weight the appropriate input data element in accordance with the current scale factor. For example, for the third output data element, using a scale factor of 6:5 as discussed above, the RAM 224 may provide a 3/5 weight factor to Xi4. Similarly, RAM 226 may provide a 3/5 weight factor to Xi3. An ALU 240 may then add the results together to provide the third output data element to interface 176.

Another scaling manipulation method combines the two scaling manipulation methods described above. That is, every Nth input data element may be dropped while the remaining input data elements may be weighted in accordance with the method described in the previous paragraphs. This method may be useful when the particular scale factor would otherwise require more hardware than is provided by the present invention. For example, for a scale factor of 8:2, the exemplary scaling manipulation method described above would calculate Xo1=Xi1+Xi2+Xi3+Xi4. This would require that the last four input data elements be stored in memory. In the combined scaling manipulation method, the first, fourth, fifth and eighth input data element may be dropped and the remaining input data elements may be weighted in accordance with the previously describe scaling method. It is recognized that various numbers of input data elements may be dropped and still be within the scope of the present invention.

It is contemplated that additional hardware may be provided to store additional input data elements. However, to reduce the size and power required by the system, the preferred embodiment only has sufficient hardware to store the current input data element and the previous input data element.

Dithering is the process of translating image data that contains data bits which indicate the grayness of a pixel into a digital image that is strictly represented by white and black pixels. Therefore, a number of data bits may be contained in the input data stream and the output may contain a single block or white bit. Consistent therewith, one dithering algorithm only requires that one "dot" of a printer be allocated to each pixel in the digitized image. To accomplish this, an exemplary dithering algorithm utilizes a dithering matrix to determine whether a particular output pixel should be black or white. For example a 4×4 dithering matrix may be used wherein the 4×4 dithering matrix may correspond to a 4×4 block of pixels within the original image. Each of the pixels within the original image may then be compared to a corresponding element within the 4×4 dithering matrix. If the value of a pixel within the original image is greater than or equal to the value of the corresponding element within the 4×4 dithering matrix, the corresponding output pixel may be set to "black". Conversely, if the value of a pixel within the original image is less than the value of the corresponding element within the 4×4 dithering matrix, the corresponding output pixel may be set to "white". As the original image is processed, the 4×4 dithering matrix may be shifted over four positions to correspond to the next succeeding 4×4 block of pixels within the original image. This is continued until the entire original image is processed.

For the exemplary dithering manipulation method described above, RAM 252 may impose various patterns on index field 182. Since index field 182 may be coupled to the address inputs of RAMs 224 and 226, the values produced by RAMs 224 and 226 may be programmed to provide a dithering matrix. That is, if four index bits 182 are provided by RAM 252 to RAMs 224 and 226, a 4×4 dithering matrix may be formed. Each of the pixels within a 4×4 block of corresponding pixels within the original image may then be "compared" to a corresponding one of the elements within the 4×4 dithering matrix. This compare is not an arithmetic compare, but rather RAM's 224 and 226 may be programmed such that if the value of the original pixel does not exceed a predetermined address, the output of the corresponding RAM may be zero.

In the exemplary dithering manipulation method, the input data elements have a greater number of bits than the resulting output data elements. In fact, the output data elements may contain only a single black or white bit. Therefore, it is contemplated that packer 164 may be used to select a predetermined number of bits that are provided by RAM 224 and RAM 226. This may be accomplished using bit select blocks 232 and 234. In the exemplary embodiment of the present invention, only the least significant bit of each of the data elements provided by RAM 224 and RAM 226 are selected by bit select blocks 232 and 234. The results are shifted into shift registers 228 and 230, respectively. Shift registers 228 and 230 provided the result to post processor 170. ALU 240 may add the results from shift registers 228 and 230 and provide the result to shift register block 248. Shift register block 248 may collect the bits as they are provided by packer 164 until a full output data word is achieved. Once a full output data word is achieved, shift register block 248 may release the data to a receiving user via interface 176.

The inputs TC-IN 184, read 186, and write 188 are provided to allow the exemplary embodiment to be compatible within the system described in U.S. patent application Ser. No. 08/287,878, filed Aug. 9, 1994, entitled "Method and Apparatus for High Speed Efficiency Bidirectional Communication Between Multiple Processors Over a Common Bus", which is incorporated herein by reference.

Similarly, output signals TC-OUT 196, OUT-RDY 198, and INP-RDY 200 are provided to make the exemplary embodiment compatible with the apparatus described in the incorporated references. Further discussion of these signals is contained in the aforementioned co-pending U.S. Patent Application that are incorporated herein by reference.

The present invention may be used to efficiently perform dithering on an input image in real time. The above description is only an exemplary dithering algorithm. It is contemplated that other dithering algorithms may be employed and still be within the scope of the present invention.

Figure 8:
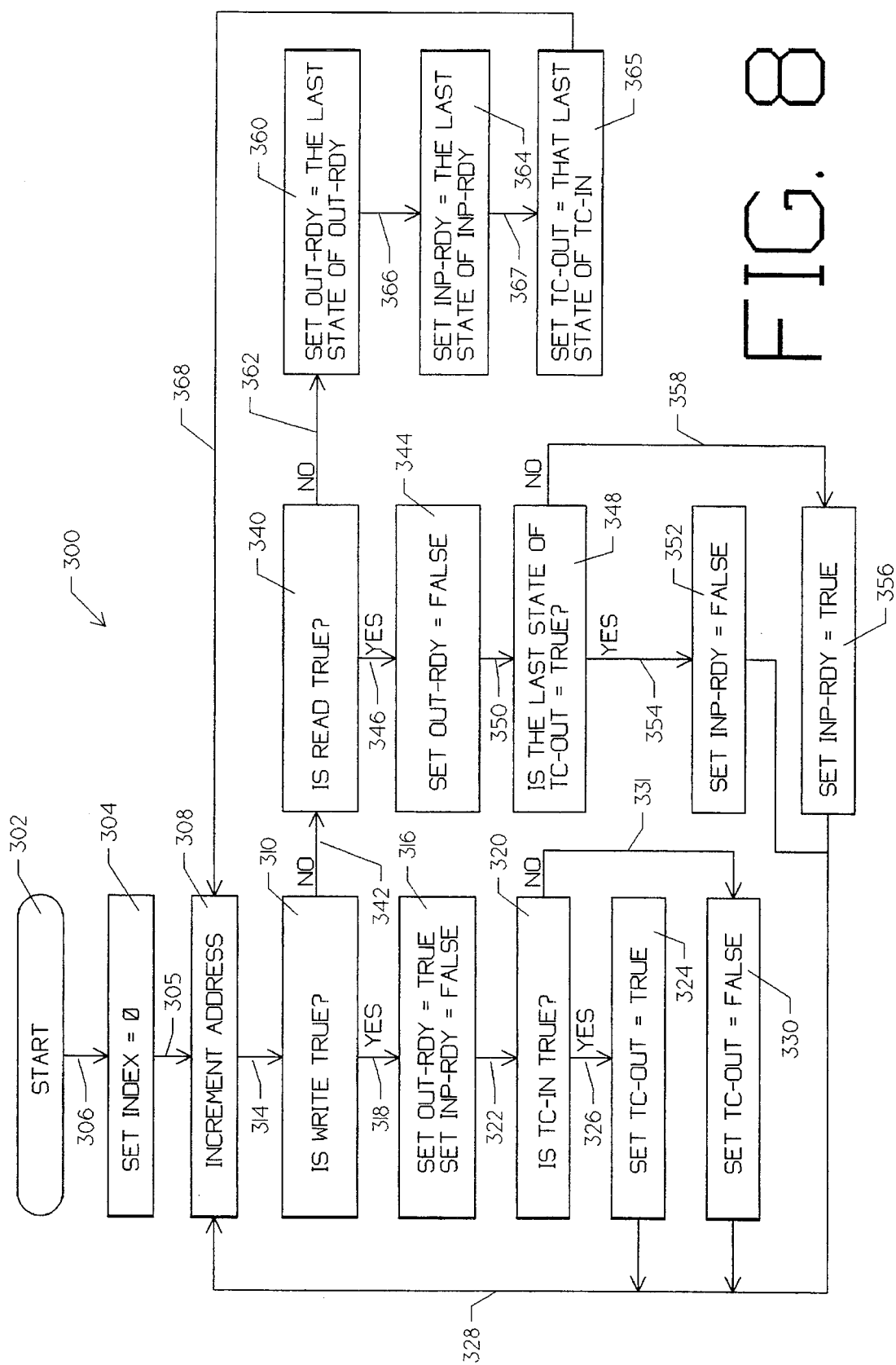
FIG. 8 is a flow diagram showing how the contents of the LUT control RAM are generated for a remapping manipulation method in a preferred embodiment of the present invention.

FIG. 8 is a flow diagram showing how the contents of the LUT control RAM are generated for a remapping manipulation method in an exemplary embodiment of the present invention. The flow diagram is shown generally at 300. The LUT control RAM 252 comprises a state machine having as inputs TC-IN 184, read 186 and write 188 along with the previous outputs provided by RAM 252.

The algorithm is entered at element 302 and control is passed to element 304 via interface 306. Element 304 sets the index field that is imposed on interface 182 to zero or some other constant value. The exemplary remapping manipulation method does not require LUT control RAM 252 to provide varying values to the index field. However, the exemplary embodiment of the present invention has the capability of providing varying values to the index field. Control is then passed to element 308 via interface 305.

In a preferred embodiment of the present invention, all addresses within LUT control RAM 252 are loaded with values which are consistent with the flow chart shown in FIG. 8. Therefore, element 308 indicates that each address location within LUT control RAM 252 may be programmed in ascending order. The flow chart shown generally at 300 shows how the contents of LUT control RAM 252 are generated in the preferred embodiment. It is recognized that this may be accomplished by using a separate computer program, thereby generating a data word for each address location within LUT control RAM 252.

Control is then passed to element 310 via interface 314. Element 310 determines whether the write signal 188 is true. If the write signal 188 is true, control is passed to element 316 via interface 318. Element 316 asserts OUT-RDY 198 to true and asserts INP-RDY 200 to false. Control is then passed to element 320 via interface 322. Element 320 determines whether TC-IN 184 is true. If TC-IN 184 is true, control is passed to element 324 via interface 326. Element 324 sets TC-OUT 196 to true. Control is then passed back to element 308 via interface 328.

Referring back to element 320, if TC-IN 184 is false, control is passed to element 330 via interface 331. Element 330 sets TC-OUT 196 to false. Control is then passed back to element 308 via interface 328.

Referring back to element 310, if the write signal 188 is false, control is passed to element 340 via interface 342. Element 340 determines whether the read signal 186 is true. If the read signal 186 is true, control is passed to element 344 via interface 346. Element 344 sets the OUT-RDY signal 198 to false. Control is then passed to element 348 via interface 350. Element 348 determines whether the last state of TC-OUT 196 is true. If the last state of TC-OUT 196 is true, control is passed to element 352 via interface 354. Element 352 sets the INP-RDY signal 200 to false. Control is then passed back to element 308 via interface 328.

Referring back to element 348, if the last state of TC-OUT 196 was false, control is passed to element 356 via interface 358. Element 356 sets the INP-RDY signal 200 to true. Control is then passed to element 308 via interface 328.

Referring back to element 340, if the read signal 186 is false, control is passed to element 360 via interface 362. Element 360 sets the signal OUT-RDY 198 to the last state of OUT-RDY 198. Control is then passed to element 364 via interface 366. Element 364 sets the signal INP-RDY 200 to the last state of INP-RDY 200. Control is then passed to element 365. Element 365 sets TC-OUT 196 to the last state of TC-IN 184. Control is then passed back to element 308 via interface 368.

The flow chart shown in FIG. 8 indicates how LUT control RAM 252 may be programmed to perform a remapping manipulation method. It is recognized, however, that there are nearly an infinite number of ways to program LUT control RAM 252 and achieve a similar result.

Figure 9:
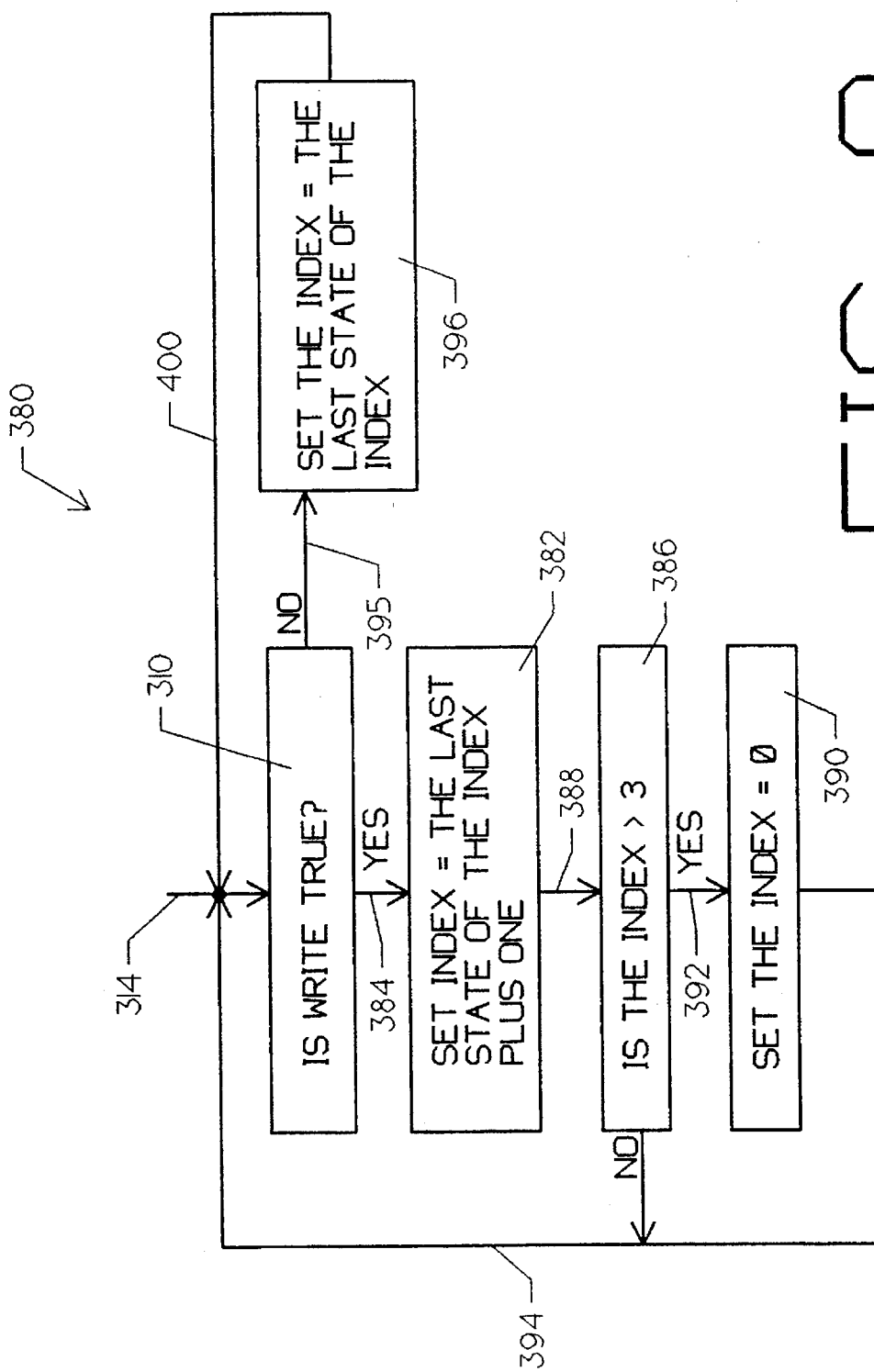
FIG. 9 is a flow diagram showing how the index field of the LUT control RAM is generated for a second order FIR filter manipulation method in a preferred embodiment of the present invention.

FIG. 9 is a flow diagram showing how the index field of the LUT control RAM 252 is generated for a second order FIR filter manipulation method in a preferred embodiment of the present invention. FIG. 9 sets forth how the LUT control RAM 252 may be programmed to control the index field imposed on interface 182 for a second order FIR filter method. The remaining control signals provided by LUT control RAM 252 may be programmed in accordance with the flow chart shown in FIG. 8.

The flow diagram is generally shown at 380. The algorithm is entered at element 310 via interface 314. Interface 314 and element 310 of FIG. 9 correspond to interface 314 and element 310 of FIG. 8, respectively. Element 310 determines whether the write signal 188 is true. If the write signal 188 is true, control is passed to element 382 via interface 384. Element 382 sets the index field equal to the last state of the index field plus one. Control is then passed to element 386 via interface 388. Element 386 determines whether the index field is greater than 3. If the index field is greater than 3, control is passed to element 390 via interface 392. Element 390 sets the index field to zero. Control is then passed back to element 310 via interface 394. Referring back to element 386, if the index is not greater than 3, control is passed back to element 310 via interface 394.

Referring back to element 310, if the write signal 188 is false, control is passed to element 396 via interface 395. Element 396 sets the index field equal to the last state of the index field. Control is then passed back to element 310 via interface 400. TC-OUT is generated in a similar manner as shown in FIG. 8.

The flow diagram shown generally at 380 is only an exemplary method of generating the index field. In this exemplary embodiment, if the write signal 188 is true, the index field is incremented from zero to three and then set back to zero. What is described is a second order FIR filter with time varying (or position dependent) constants wherein the constants have four possible states. It is contemplated, however, that more complex index field definitions may be accomplished by the present invention. It is also contemplated that the index field may remain constant thereby having a non-time varying FIR filter.

Figure 10:
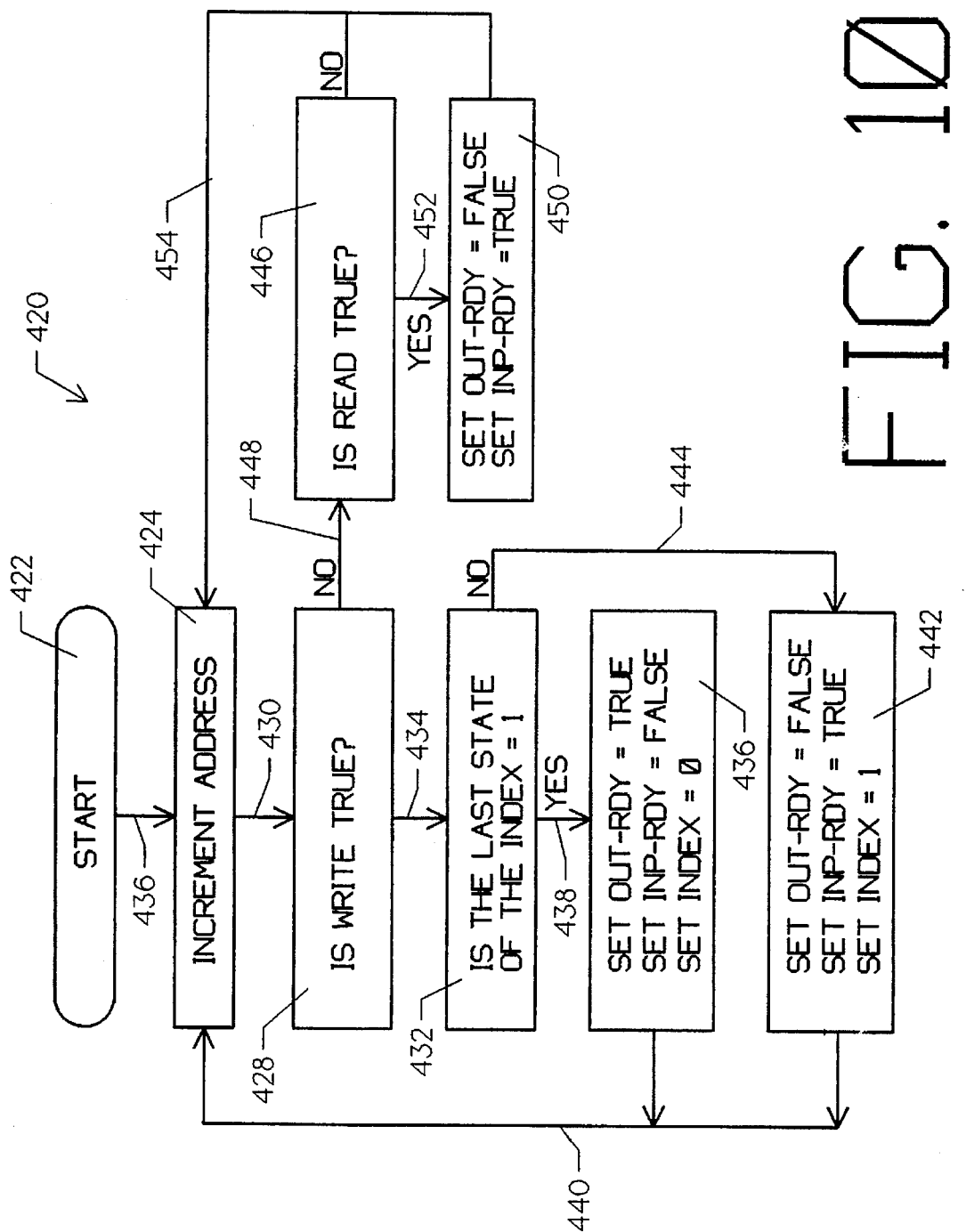
FIG. 10 is a flow diagram showing how the contents of the LUT control RAM are generated for a scaling manipulation method in a preferred embodiment of the present invention.

FIG. 10 is a flow diagram showing an exemplary method for generating the contents of LUT control RAM 252 for a 2:1 scaling manipulation method. The algorithm shown in FIG. 10 is only intended to show the basic programming scheme used in the preferred embodiment. Other scaling manipulation methods may be implemented in a similar manner.

The flow diagram is generally shown at 420. This algorithm may be implemented in software on a separate computer system, thereby generating data files which may be down loaded into LUT control RAM 252 when desired. The algorithm is entered at element 422. Control is then passed to element 424 via interface 436. Element 424 indicates that in an exemplary embodiment of the present invention, all addresses of LUT control RAM 252 may be programmed in ascending order. Control is passed to element 428 via interface 430. Element 428 determines whether the write signal is true. If the write signal 188 is true, control is passed to element 432 via interface 434. Element 432 determines whether the last state of the index field is equal to one. If the last state of the index field is equal to one, control is passed to element 436 via interface 438. Element 436 sets the OUT-RDY signal 188 to true, the INP-RDY signal 200 to false, and the index field to zero. Control is then passed back to element 424 via interface 440.

Referring back to element 432, if the last state of the index field is not equal to one, control is passed to element 442 via interface 444. Element 442 sets the OUT-RDY signal 198 to false, the INP-RDY signal 200 to true, and the index field to one. Control is then passed back to element 424 via interface 440.

Referring back to element 428, if the write signal 188 is false, control is passed to element 446 via interface 448. Element 446 determines whether the read signal 186 is true. If the read signal 186 is true, control is passed to element 450 via interface 452. Element 450 sets OUT-RDY signal 198 to false and sets INP-RDY signal 200 to true. Control is then passed back to element 424 via interface 454. Referring back to element 446, if the read signal 186 is false, control is passed directly back to element 424 via interface 454. TC-OUT is generated in a similar manner as shown in FIG. 8.

Figure 11:
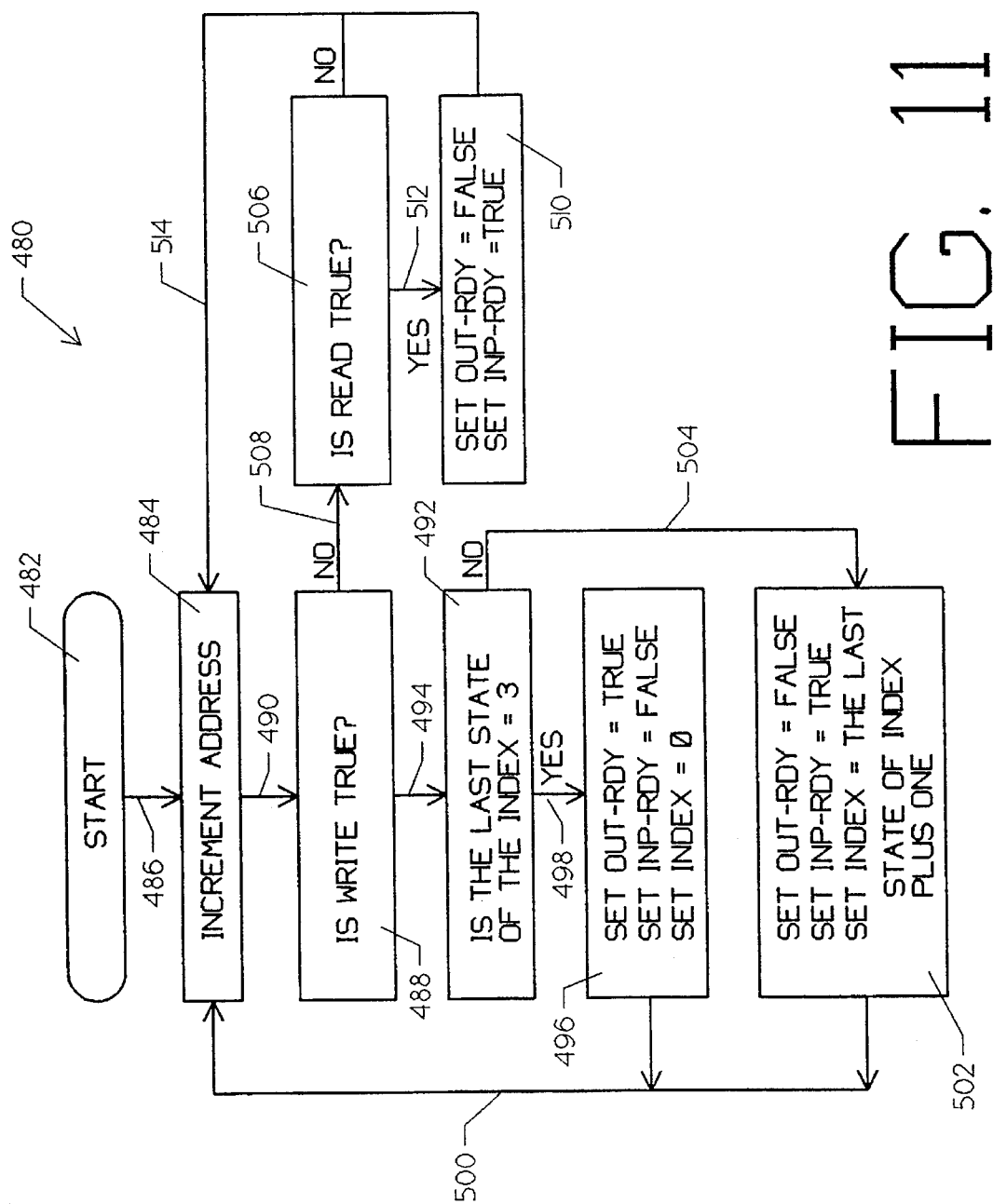
FIG. 11 is a flow diagram showing how the contents of the LUT control RAM are generated for a dithering manipulation method in a preferred embodiment of the present invention.

FIG. 11 is a flow diagram showing how the contents of the LUT control RAM 252 are generated for a dithering manipulation method in an exemplary embodiment of the present invention. The algorithm is entered at element 482. Control is then passed to element 484 via interface 486. Element 484 indicates that in an exemplary embodiment of the present invention, all addresses within LUT control RAM 252 may be assigned a value in accordance with the flow diagram generally shown at 480 in ascending order. Control is then passed to element 484 via interface 490. Element 488 determines whether the write signal 188 is true. If the write signal 188 is true, control is passed to element 492 via interface 494. Element 492 determines whether the last state of the index field equals 3. If the last state of the index field equals 3, control is passed to element 496 via interface 498. Element 496 sets the OUT-RDY signal 188 to true, the INP-RDY signal 200 to false, and the index field to zero. Control is then passed back to element 484 via interface 500.

Referring back to element 492, if the last state of the index field is not equal to 3, control is passed to element 502 via interface 504. Element 502 sets the OUT-RDY signal 198 to false, the INP-RDY signal 200 to true, and the index field to the last state of the index field plus one. Control is then passed back to element 484 via interface 500.

Referring back to element 488, if the write signal 188 is false, control is passed to element 506 via interface 508. Element 506 determines whether the read signal 186 is true. If the read signal 186 is true, control is passed to element 510 via interface 512. Element 510 sets the OUT-RDY signal 198 to false and sets the INP-RDY signal 200 to true. Control is then passed back to element 484 via interface 514. Referring back to element 506, if the read signal 186 is false, control is passed directly back to element 484 via interface 514.

The above implementation is only exemplary are reflects a dithering algorithm that receives two input pixels at a time and wherein packer 164 generates an 8 bit output. Because of this exemplary implementation, packer 164 requires four cycles to generate an 8 bit output. Therefore, index field 182 counts from 0 to 3 so that LUT control RAM 252 knows when a valid output can be provided on interface 176. It is contemplated that other implementations may be provided and still be within the scope of the present invention.

Having thus described the preferred embodiments of the present invention, those of skill in the art will readily appreciate that the teachings found herein may be applied to yet other embodiments within the scope of the claims hereto attached.

I claim:

1. In an image processing system having a stream of input data comprising a plurality of data elements and a receiving user, the image processing system being capable of performing at least one data manipulation method on the stream of input data and provide the result to the receiving user, the improvement comprising:

a. a first LUT element having an input and an output, said input for receiving the stream of input data, said first LUT element performing a predetermined function on said the stream of input data and providing a result to said output;

b. a second LUT element having an input and an output, said input for receiving the stream of input data, said second LUT element performing a predetermined function on the stream of input data and providing a result to said output;

c. an input data select block coupled to said input of said first LUT element and to said input of said second LUT element for routing the stream of input data to said input of said first LUT element and to said input of said second LUT element;

d. a packer coupled to said first LUT element and to said second LUT element for selecting a predetermined portion of said result provided by said first LUT element and for selecting a predetermined portion of said result provided by said second LUT element;

e. a post processor coupled to said packer for collecting said selected portion of said result provided by said first LUT element and for collecting said selected portion of said result provided by said second LUT element and providing a result to the receiving users; and f. a control circuit for providing an index field to said input of said first LIFE element and to said input of said second LUT element.

2. An improvement according to claim 1 wherein said first LUT element comprises a first Random Access Memory having an address input and a data output, said address input of said first Random Access Memory being coupled to said input of said first LUT element and said data output of said first Random Access Memory being coupled to said output of said first LUT element.

3. An improvement according to claim 2 wherein said second LUT element comprises a second Random Access Memory having an address input and a data output, said address input of said second Random Access Memory being coupled to said input of said second LUT element and said data output of said second Random Access Memory being coupled to said output of said second LUT element.

4. An improvement according to claim 3 wherein said input data select block routes a portion of each of the plurality of data elements of the stream of input data to said input of said first LUT element and further routes a portion of each of the plurality of data elements of the stream of input data to said input of said second LUT element.

5. An improvement according to claim 3 wherein the stream of input data comprises a current data element and at least one previous data element, the input data select block comprises at least one register for storing said at least one previous data element of said stream of input data elements.

6. An improvement according to claim 5 wherein said input data select block routes a portion of each of the plurality of data elements of the stream of input data to said input of said first LUT element and further routes said at least one previous data element of the stream of input data to said input of said second LUT element.

7. An improvement according to claim 3 wherein said post processor further comprises an arithmetic logic unit for performing arithmetic operations on said selected portion of said result provided by said first LUT element and said selected portion of said result provided by said second LUT element.

8. An improvement according to claim 7 wherein said control circuit comprises a Random Access Memory having an address input and a data output, and a feedback register having an input and an output; said data output of said Random Access Memory providing said index field and a plurality of output control signals, said index field and said plurality of output control signals being coupled to said input of said feedback register; said address input of said Random Access Memory being coupled to said output of said feedback register and further coupled to a plurality of input control signals.

9. An image processing apparatus having a stream of input image data comprising a plurality of data elements and a receiving user, comprising:

a. first storage means having an input and an output wherein said input of said first storage means for receiving input data, said first storage means for performing a predetermined function on said input data via a first look-up method, and providing a result to said output;

b. second storage means having an input and an output wherein said input of said second storage means for receiving input data, said second storage means for performing a predetermined function on said input data via a second look up method, and providing a result to said output;

c. routing means coupled to said input of said first storage means and to said input of said second storage means for routing the stream of input image data to said input of said first storage means and to said input of said second storage means;

d. selecting means coupled to said first storage means and to said second storage means for selecting a predetermined portion of said result provided by said first storage means and for selecting a predetermined portion of said result provided by said second storage means; and e. collecting means coupled to said selecting means for collecting said selected portion of said result provided by said first storage means and for collecting said selected portion of said result provided by said second storage means and providing a result to the receiving users.

10. An image processing apparatus according to claim 9 wherein said first storage means comprises a first Random Access Memory having an address input and a data output, said address input of said first Random Access Memory being coupled to said input of said first storage means and said data output of said first Random Access Memory being coupled to said output of said first storage means.

11. An image processing apparatus according to claim 10 wherein said second storage means comprises a second Random Access Memory having an address input and a data output, said address input of said second Random Access Memory being coupled to said input of said second storage means and said data output of said second Random Access Memory being coupled to said output of said second storage means.

12. An image processing apparatus according to claim 11 wherein said routing means routes a portion of each of the plurality of data elements to said input of said first storage means and further routes a portion of each of the plurality of data elements to said input of said second storage means.

13. An image processing apparatus according to claim 12 wherein said stream of input data elements comprises a current data element and at least one previous data element, the routing means comprises at least one register for storing said at least one previous data element of said stream of input data elements.

14. An image processing apparatus according to claim 13 wherein said routing means routes a portion of each of the plurality of data elements to said input of said first storage means and further routes said at least one previous data element to said input of said second storage means.

15. An image processing apparatus according to claim 11 wherein said collecting means further comprises an arithmetic logic unit for performing arithmetic operations on said selected portion of said result provided by said first storage means and said selected portion of said result provided by said second storage means.

16. An image processing apparatus according to claim 15 further comprising a control means wherein said control means comprises a Random Access Memory having an address input and a data output, and a feedback register having an input and an output; said data output of said Random Access Memory of said control means providing an index field and a plurality of output control signals, said index field and said plurality of output control signals being coupled to said input of said feedback register; said address input of said Random Access Memory of said control means being coupled to said output of said feedback register and further coupled to a plurality of input control signals.

17. A method for performing a predetermined one of a plurality of data manipulation algorithms on a plurality of input data elements resulting in a plurality of output data elements, comprising:

a. providing a first memory element having an address input and a data output, the first memory element having a plurality of contents wherein a particular one of the plurality of contents is provided to the output when an address is provided on the address input;

b. providing a second memory element having an address input and a data output, the second memory element having a plurality of contents wherein a particular one of the plurality of contents is provided to the output when an address is provided on the address input;

c. providing an index field to the address input of the first memory element and to the address input of the second memory element;

d. providing an adder wherein the adder is coupled to the output of the first memory element and is further coupled to the output of the second memory element;

e. providing a first one of the plurality of input data elements to the address input of the first memory element;

f. providing a second one of the plurality of input data elements to the address input of the second memory element;

g. programming the contents of the first memory element and the second memory element and further programming the index field to perform the predetermined one of the plurality of data manipulation algorithms;

h. adding a predetermined portion of the particular one of the plurality of contents that is provided to the output of the first memory element and a predetermined portion of the particular one of the plurality of contents that is provided to the output of the second memory element resulting in one of the plurality of output data elements; and i. repeating steps (e)–(h) until all of the plurality of input data elements have processed.

18. A method according to claim 17 wherein said programming step is programmed to implement a remapping data manipulation method.

19. A method according to claim 17 wherein said programming step is programmed to implement a scaling data manipulation method.

20. A method according to claim 17 wherein said programming step is programmed to implement a dithering data manipulation method.

21. A method according to claim 17 wherein said programming step is programmed to implement a second order FIR data manipulation method.

* * * * *

UNITED STATES PATENT AND TRADEMARK OFFICE
CERTIFICATE OF CORRECTION

PATENT NO. : 5,517,584

DATED : May 14, 1996

INVENTOR(S) : Kevin F. Jennings

It is certified that error appears in the above-identified patent and that said Letters Patent is hereby corrected as shown below:

Column 2, line 17, change "know" to --known--.

Column 3, line 4, change "know" to --known--.

Column 9, line 55, change "in" to --is--.

Column 10, line 2, change "An" to --A--.

Column 13, line 3, change "valued" to --values--.

Column 13, line 66, change "shifts" to --shift--.

Column 16, line 50, change "determined" to --determine--.

Column 17, line 12, change "describe" to --described--.

Column 22, line 2, change "LIFE" to --LUT--.

Signed and Sealed this

Thirteenth Day of August, 1996

Attest:

BRUCE LEHMAN

Attesting Officer     Commissioner of Patents and Trademarks